United States Patent
Nagata et al.

(10) Patent No.: US 9,419,760 B2
(45) Date of Patent: Aug. 16, 2016

(54) RADIO COMMUNICATION SYSTEM, BASE STATION APPARATUS, USER TERMINAL, AND RADIO COMMUNICATION METHOD

(71) Applicant: NTT DOCOMO, INC., Tokyo (JP)

(72) Inventors: Satoshi Nagata, Tokyo (JP); Yoshihisa Kishiyama, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 19 days.

(21) Appl. No.: 14/398,862

(22) PCT Filed: Apr. 19, 2013

(86) PCT No.: PCT/JP2013/061639
§ 371 (c)(1),
(2) Date: Nov. 4, 2014

(87) PCT Pub. No.: WO2013/168542
PCT Pub. Date: Nov. 14, 2013

(65) Prior Publication Data
US 2015/0117351 A1   Apr. 30, 2015

(30) Foreign Application Priority Data
May 10, 2012   (JP) .................................. 2012-108743

(51) Int. Cl.
| | |
|---|---|
| H04L 5/00 | (2006.01) |
| H04J 1/00 | (2006.01) |
| H04W 24/10 | (2009.01) |
| H04W 72/08 | (2009.01) |
| H04J 11/00 | (2006.01) |

(52) U.S. Cl.
CPC ................. *H04L 5/0048* (2013.01); *H04J 1/00* (2013.01); *H04J 11/0023* (2013.01); *H04L 5/00* (2013.01); *H04W 24/10* (2013.01); *H04W 72/082* (2013.01)

(58) Field of Classification Search
None
See application file for complete search history.

(56) References Cited

U.S. PATENT DOCUMENTS

| | | | |
|---|---|---|---|
| 8,184,573 B2 | 5/2012 | Higuchi et al. | |
| 2010/0238984 A1* | 9/2010 | Sayana | H04B 7/0634 375/219 |

(Continued)

FOREIGN PATENT DOCUMENTS

| | | |
|---|---|---|
| JP | 2009-171025 A | 7/2009 |
| JP | 2011-142513 A | 7/2011 |

(Continued)

OTHER PUBLICATIONS

International Search Report issued in PCT/JP2013/061639 mailed on Jul. 30, 2013 (2 pages).

(Continued)

*Primary Examiner* — Garu Mui
(74) *Attorney, Agent, or Firm* — Osha Liang LLP

(57) ABSTRACT

The present invention is designed to measure interference with high accuracy in future systems that do not rely on CRSs. A base station apparatus has a determining section (401) that determines the resources to allocate desired signal measurement reference signals (CSI-RSs) and interference estimation reference signals to, and a reference signal generating section (405) that applies scrambling sequences and generates the interference estimation reference signal, and the scrambling sequences are controlled such that varying scrambling sequences are applied to the interference estimation reference signals between a plurality of transmission points or transmission point groups.

19 Claims, 14 Drawing Sheets

(56) References Cited

U.S. PATENT DOCUMENTS

| | | | |
|---|---|---|---|
| 2012/0207199 A1* | 8/2012 | Guo | H04L 1/0026 375/224 |
| 2012/0213261 A1* | 8/2012 | Sayana | H04L 5/0094 375/224 |
| 2012/0287875 A1 | 11/2012 | Kim et al. | |
| 2012/0300653 A1 | 11/2012 | Kishiyama et al. | |
| 2013/0021926 A1* | 1/2013 | Geirhofer | H04L 5/0048 370/252 |
| 2013/0196675 A1* | 8/2013 | Xiao | H04W 72/082 455/452.1 |
| 2013/0208677 A1* | 8/2013 | Lee | H04L 5/0094 370/329 |
| 2013/0242778 A1* | 9/2013 | Geirhofer | H04L 1/0026 370/252 |
| 2013/0258976 A1 | 10/2013 | Nagata et al. | |
| 2014/0153526 A1* | 6/2014 | Mazzarese | H04B 7/024 370/329 |
| 2014/0307576 A1* | 10/2014 | Nagata | H04L 1/0001 370/252 |
| 2014/0355408 A1* | 12/2014 | Tong | H04J 13/0003 370/208 |

FOREIGN PATENT DOCUMENTS

| | | |
|---|---|---|
| JP | 2012-080423 A | 4/2012 |
| WO | 2008/136462 A1 | 11/2008 |
| WO | 2011/083794 A1 | 7/2011 |
| WO | 2011/115421 A2 | 9/2011 |

OTHER PUBLICATIONS

NTT DOCOMO; "Enhanced Interference Measurement Mechanism for Rel-11"; 3GPP TSG RAN WG1 Meeting #68; R1-120405; Dresden, Germany; Feb. 6-10, 2012 (6 pages).

ZTE; "The issues on CSI-RD sequence in CoMP"; 3GPP TSG RAN WG1 Meeting #68, R1-120306; Dresden, Germany; Feb. 6-10, 2012 (2 pages).

3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN) (Release 7)"; Sep. 2006 (57 pages).

Office Action issued in corresponding Japanese Application No. 2012-108743, mailed Jan. 5, 2016 (10 pages).

Search Report issued in corresponding European Application No. 13787458.2, mailed Dec. 1, 2015 (5 pages).

* cited by examiner

| SEQUENCE INDICATOR | TYPE OF SEQUENCE |
|---|---|
| 00 | 1 |
| 01 | 2 |
| 10 | 3 |

FIG.8

RADIO COMMUNICATION SYSTEM, BASE STATION APPARATUS, USER TERMINAL, AND RADIO COMMUNICATION METHOD

TECHNICAL FIELD

The present invention relates to a radio communication system, a base station apparatus, a user terminal and a radio communication method in a next-generation mobile communication system.

BACKGROUND ART

In a UMTS (Universal Mobile Telecommunications System) network, attempts are made to optimize features of the system, which are based on W-CDMA (Wideband Code Division Multiple Access), by adopting HSDPA (High Speed Downlink Packet Access) and HSUPA (High Speed Uplink Packet Access), for the purposes of improving spectral efficiency and improving the data rates. With this UMTS network, long-term evolution (LTE) is under study for the purposes of further increasing high-speed data rates, providing low delay, and so on (non-patent literature 1).

In the third-generation system, it is possible to achieve a transmission rate of maximum approximately 2 Mbps on the downlink by using a fixed band of approximately 5 MHz. Meanwhile, in a system of the LTE scheme, it is possible to achieve a transmission rate of about maximum 300 Mbps on the downlink and about 75 Mbps on the uplink by using a variable band which ranges from 1.4 MHz to 20 MHz. Furthermore, with the UMTS network, successor systems of LTE are also under study, for the purpose of achieving further broadbandization and higher speed (also referred to as, for example, LTE-advanced or LTE-enhancement (hereinafter "LTE-A")).

In the downlink of the LTE system (for example, Rel. 8 LTE), CRSs (Cell-specific Reference Signals), which are associated with cell IDs, are defined. These CRSs are used to demodulate user data, and, in addition, used to measure downlink channel quality (CQI: Channel Quality Indicator) for scheduling and adaptive control, and so on. Meanwhile, in the downlink of successor systems of LTE (for example, Rel. 10 LTE), CSI-RSs (Channel State Information Reference Signals) are under study for dedicated use of CSI (Channel State Information) measurement.

CITATION LIST

Non-Patent Literature

Non-Patent Literature 1: 3GPP, TR 25.912 (V7.1.0), "Feasibility Study for Evolved UTRA and UTRAN," September 2006

SUMMARY OF INVENTION

Technical Problem

Now, as a promising technique for further improving the system performance of the LTE system, there is inter-cell orthogonalization. For example, in the LTE-A system, intra-cell orthogonalization is made possible by orthogonal multiple access on both the uplink and the downlink. That is to say, on the downlink, orthogonality is established between user terminal UEs (User Equipments) in the frequency domain. On the other hand, between cells, like in W-CDMA, interference randomization by one-cell frequency re-use is fundamental.

So, in the 3GPP (3rd Generation Partnership Project), coordinated multi-point transmission/reception (CoMP) techniques are under study as techniques to realize inter-cell orthogonalization. In this CoMP transmission/reception, a plurality of cells coordinate and perform signal processing for transmission and reception for one user terminal UE or for a plurality of user terminal UEs. By adopting these CoMP transmission/reception techniques, improvement of throughput performance is expected, especially with respect to user terminal UEs located on cell edges.

In this way, in the LTE-A system, there are transmission modes to transmit from a plurality of transmission points to a user terminal, in addition to modes to transmit from one transmission point to a user terminal. Consequently, it is important to determine channel quality information in a user terminal by taking into account interference between a plurality of transmission points and so on.

As described above, although, in the LTE system, interference is measured using CRSs that are associated with cell IDs, in a system configuration where a plurality of transmission points are assigned the same cell ID, there is a problem that a user terminal is unable to separate the CRSs that are transmitted at the same time from the plurality of transmission points where the same cell ID is assigned. Meanwhile, in LTE-A (Rel. 10), CSI-RSs that are defined for measuring the signal components of received signals (desired waves) can be separated even when a system configuration to assign the same cell ID to a plurality of transmission points is used. However, when interference is measured using CSI-RSs, the low density of CSI-RSs makes it difficult to measure interference with high accuracy.

The present invention has been made in view of the above, and it is therefore an object of the present invention to provide a radio communication system, a base station apparatus, a user terminal, and a radio communication method whereby interference can be measured with high accuracy in future systems that do not rely on CRSs.

Solution to Problem

The radio communication system of the present invention is a radio communication system providing a plurality of base station apparatuses that transmit desired signal measurement reference signals for measuring a channel state, and interference estimation reference signals, and a user terminal that connects with the plurality of base station apparatuses via a radio link, and, in this radio communication system: each base station apparatus has: a determining section configured to determine resources where the desired signal measurement reference signals and the interference estimation reference signals are allocated; and a reference signal generating section configured to apply scrambling sequences and generate the interference estimation reference signals; and wherein, when at least the determining section allocates the interference estimation reference signals and interference estimation reference signals transmitted from another transmission point or from a plurality of other transmission points to the same resources, the reference signal generating section controls the scrambling sequence so that varying scrambling sequences are applied between a plurality of transmission points or transmission point groups where the interference estimation reference signals are allocated to the same resources.

Advantageous Effects of Invention

According to the present invention, it is possible to provide a radio communication system, a base station apparatus, a user terminal, and a radio communication method whereby interference can be measured with high accuracy in future systems that do not rely on CRSs.

BRIEF DESCRIPTION OF DRAWINGS

FIG. 8 is a diagram to show a table in which the types and bit values of scrambling sequences to apply to interference estimation reference signals are combined;

DESCRIPTION OF EMBODIMENTS

Figure 1:
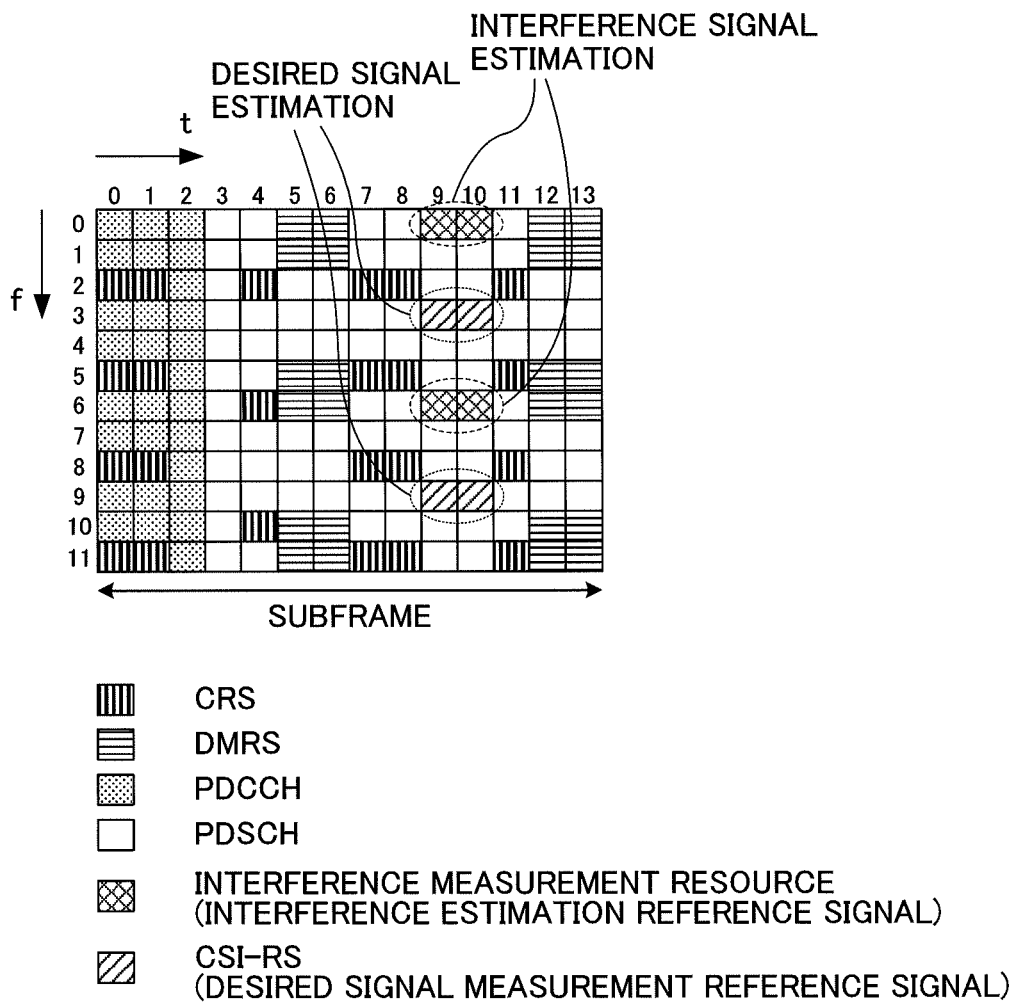
FIG. 1 is a diagram to show an example of a CSI-RS pattern including interference estimation reference signals.

First, the CSI-RS, which is one of the reference signals employed in successor systems of LTE (for example, Rel. 10 LTE), will be described.

The CSI-RS is a reference signal that is used to measure CSI such as CQI (Channel Quality Indicator), PMI (Precoding Matrix Indicator), RI (Rank Indicator) and so on as the channel state. Unlike CRSs that are allocated to all subframes, CSI-RSs are allocated in a predetermined cycle—for example, in a ten-subframe cycle. Also, CSI-RSs are specified by parameters such as position, sequence and transmission power. The positions of CSI-RSs include subframe offset, cycle, and subcarrier-symbol offset (index).

Note that, as CSI-RSs, non-zero-power CSI-RSs and zero-power CSI-RSs are defined. With non-zero-power CSI-RSs, transmission power is distributed to the resources where the CSI-RSs are allocated, and, with zero-power CSI-RSs, transmission power is not distributed to the resources where the CSI-RSs are allocated (that is, the CSI-RSs are muted).

In one subframe defined in LTE, CSI-RSs are allocated not to overlap with control signals such as the PDCCH (Physical Downlink Control Channel), user data such as the PDSCH (Physical Downlink Shared Channel), and other reference signals such as CRSs (Cell-specific Reference Signals) and DM-RSs (Demodulation-Reference Signals). One subframe consists of twelve subcarriers that are consecutive in the frequency direction and fourteen symbols (one resource block (RB) pair) that are consecutive in the time axis direction. Furthermore, as for resources where CSI-RSs can be allocated, a set of two resource elements (REs) that neighbor each other in the time axis direction is allocated, from the perspective of suppressing the PAPR.

When estimating interference using CSI-RSs, it is possible to determine interference power from the residual of two CSI-RSs that neighbor each other in the time axis direction. By mapping CSI-RSs to two resources (REs) that neighbor each other in the time axis direction in pair, the channel states at the respective mapping positions of the CSI-RSs become nearly equal, so that, when estimating interference power from the residual of the two CSI-RSs, it is possible to estimate interference with high accuracy.

Also, in the LTE-A system, there are transmission modes to transmit from a plurality of transmission points to a user terminal, so that, when calculating CQI by means of CSI-RSs, the accuracy of interference measurement becomes important.

For example, CoMP transmission is a transmission mode from a plurality of transmission points. Downlink CoMP transmission includes coordinated scheduling/coordinated beamforming, and joint processing. Coordinated scheduling/coordinated beamforming refers to a method of transmitting a shared data channel from only one cell to one user terminal UE, and allocates radio resources in the frequency/space domain, taking into account interference from other cells and interference against other cells. Meanwhile, joint processing refers to a method of transmitting a shared data channel from a plurality of cells at the same time by applying precoding, and includes joint transmission to transmit a shared data channel from a plurality of cells to one user terminal UE, and dynamic point selection (DPS) to select one cell instantaneously and transmit a shared data channel. There is also a transmission mode referred to as dynamic point blanking (DPB), which stops data transmission in a certain region with respect to a transmission point that causes interference.

Although it is effective to apply CSI-RSs from a plurality of transmission points and measure interference in this way when CoMP and so on are applied, given that the density of CSI-RSs in one resource block pair as defined in LTE (Rel. 10 LTE) is low, it is difficult to measure interference from other transmission points (other cells) with high accuracy.

So, the applicant has proposed, as shown in FIG. 1, adding CSI-RSs to use to estimate interference signal power (hereinafter referred to as "interference estimation reference signals"), in addition to the CSI-RSs to use to estimate desired signal power (hereinafter referred to as "desired signal measurement CSI-RSs"), and controlling the resources of the interference estimation reference signals between a plurality of transmission points. By this means, interference can be measured using both desired signal measurement CSI-RSs (conventional CSI-RSs) and interference estimation reference signals, so that it is possible to improve the accuracy of interference measurement.

Here, an example of a method of interference estimation using interference estimation reference signals will be described. Note that, although, in the following description, a system configuration will be described where two base station apparatuses serve as transmission points (TP #1 and TP #2), the number of transmission points (TPs) is by no means limited to two.

Figure 2A:
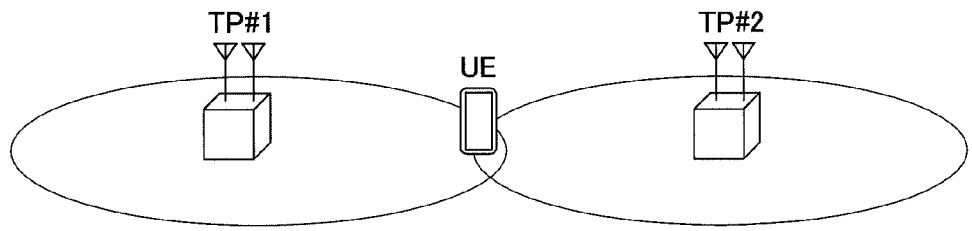
FIG. 2 provides diagrams to show examples of CSI-RS patterns including interference estimation reference signals transmitted from a plurality of transmission points.
Figure 2B:
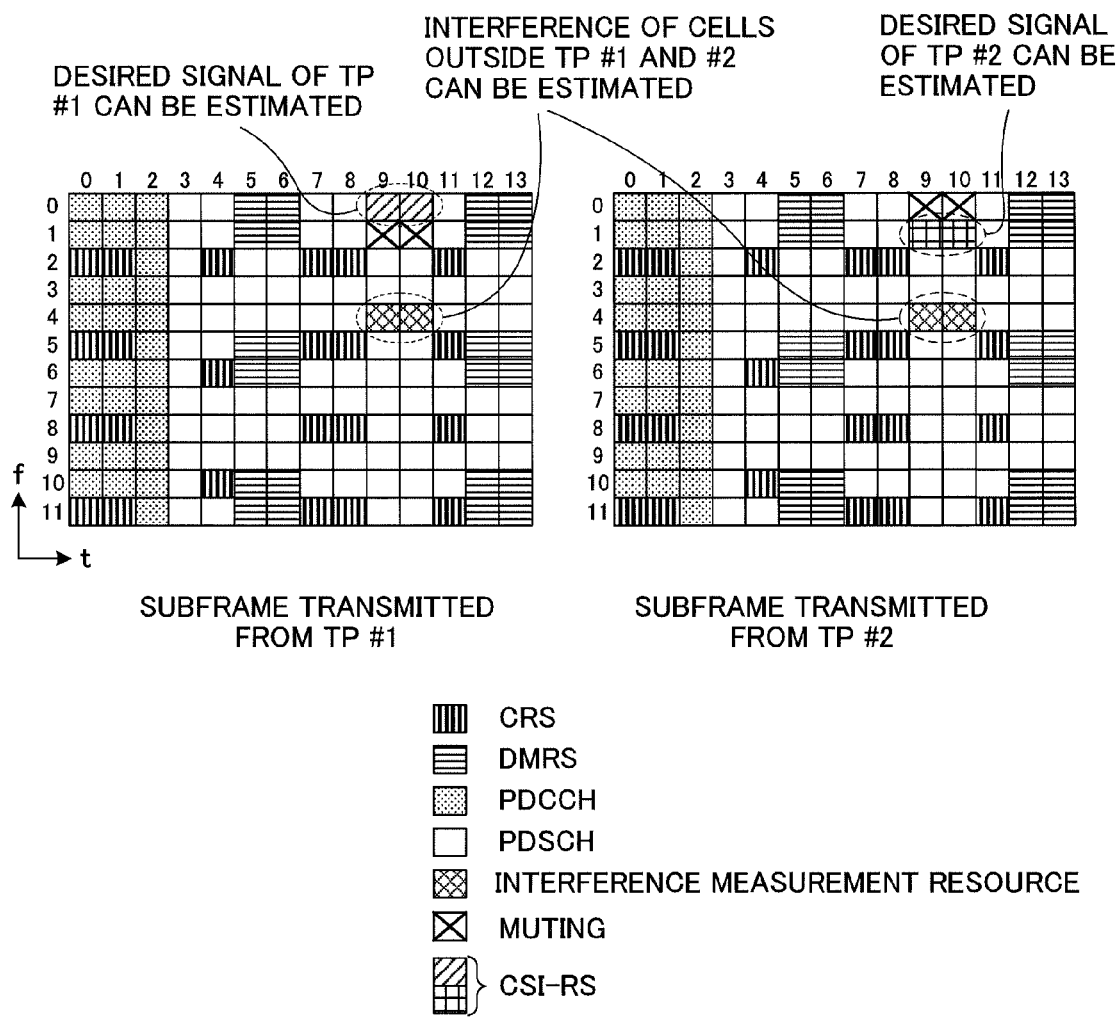

FIG. 2A shows a case where transmission is carried out from transmission points TP #1 and TP #2 to a user terminal UE. Also, FIG. 2B shows an example of a CSI-RS pattern in which interference estimation reference signals are arranged in interference measurement resources. In FIG. 2B, the subframe on the left side is the subframe to be transmitted from TP #1, and the subframe on the right side is the subframe to be transmitted from TP #2.

Also, FIG. 2B shows a case where interference estimation reference signals are arranged in the same resources between a plurality of transmission points (TP #1 and TP #2). To be more specific, in both subframes of TP #1 and TP #2, interference estimation reference signals are arranged in the REs that are the fourth REs in the frequency axis direction and that are the ninth and tenth REs in the time axis direction. By using these interference estimation reference signals, it is possible to estimate interference signals of cells outside TP #1 and TP #2.

Also, when, as shown in FIG. 2, desired signal measurement CSI-RSs (conventional CSI-RSs) are arranged in the REs that are the zeroth REs in the frequency axis direction and that are the ninth and tenth REs in the time axis direction in the subframe of TP #1, it becomes possible to estimate the desired signals of TP #1 in these REs. Furthermore, when, as shown in FIG. 2, desired signal measurement CSI-RSs are arranged in the REs that are the first REs in the frequency axis direction and that are the ninth and tenth REs in the time axis direction in the subframe of TP #2, it becomes possible to estimate the desired signals of TP #2 in these REs.

In this case, information about the method of estimating desired signals and the method of estimating interference signals is signaled from the base station apparatuses to the user terminal. That is to say, information about the REs (SMRs: Signal Measurement Resources) that are used to estimate desired signals, information about the REs (IMRs: Interference Measurement Resources) that are used to measure interference signals, and information about the combination of SMRs and IMRs are signaled from the base station apparatuses to the user terminal. These pieces of information may be reported from the base station apparatuses to the user terminal through higher layer signaling (for example, through RRC signaling), or may be reported from the base station apparatuses to the user terminal dynamically by means of downlink control information (DCI).

Now, the method of calculating interference power in accordance with the transmission mode will be described.

Figure 3A:
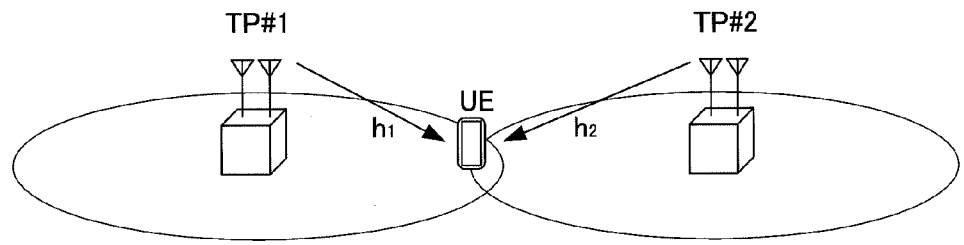
FIG. 3 provides diagrams to show examples of CSI-RS patterns including interference estimation reference signals transmitted from a plurality of transmission points.

FIG. 3 shows resource blocks, each being one resource block cut out from predetermined symbols (for example, the eighth to eleventh symbols) in FIG. 2, and shows examples of CSI-RS patterns in which interference estimation reference signals are arranged in the same resources between a plurality of transmission points. Note that, in the following description, other signals (the DMRS, the PDSCH and so on) will be omitted for ease of explanation.

Figure 3B:
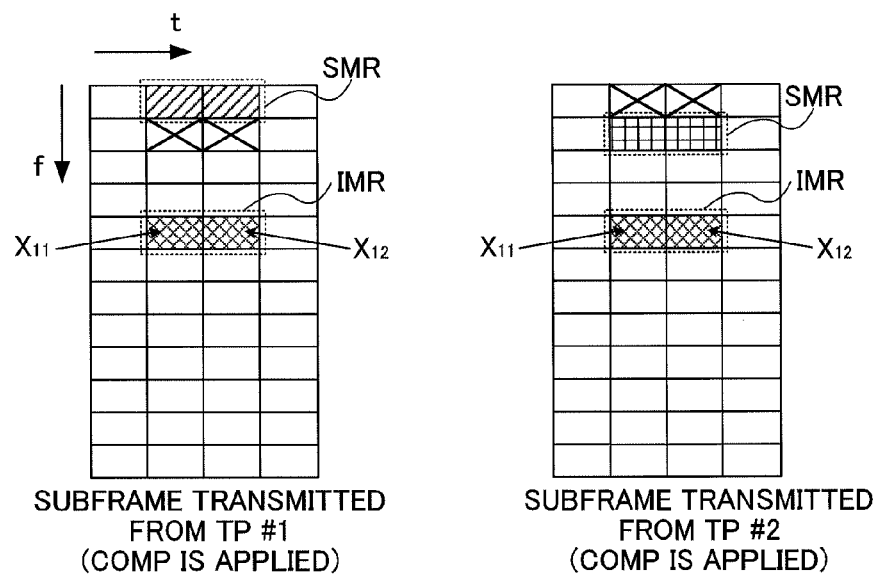
Figure 3C:
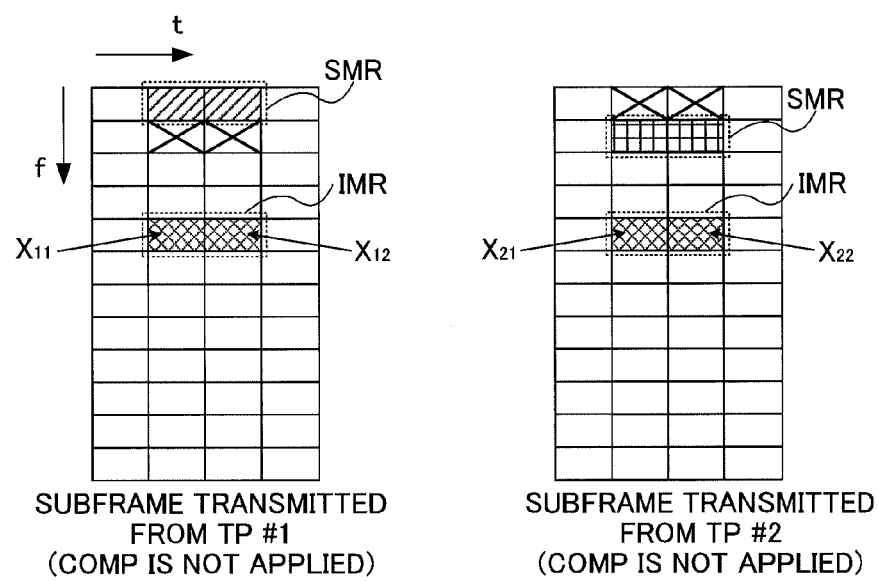

Also, in FIG. 3B and FIG. 3C, the subframes on the left side are the subframes to be transmitted from TP #1, and the subframes on the right side are the subframes to be transmitted from TP #2. Also, FIG. 3B shows an example of a CSI-RS pattern that is used when CoMP is applied, and FIG. 3C shows an example of a CSI-RS pattern that is used when CoMP is not applied (upon single-cell transmission).

In the user terminal, the received signal "$y_j$" in a predetermined (for example, the j-th) RE (IMR) to use to estimate interference signal power can be represented as $y_j=h_i X_{ij}+n_j$, where "$X_{ij}$" is the CSI-RS symbol of the j-th RE (IMR) transmitted from TP #i, "$h_i$" is the channel fading from the first antenna of TP #i to the user terminal, and "$n_j$" is the noise (AWGN) of the j-th RE (IMR) in the user terminal.

When CoMP is applied in TP #1 and TP #2 (see FIG. 3B), the received signals ($y_1$ and $y_2$) in two REs (IMRs) that neighbor each other in the time axis direction can be represented by following equation 1, respectively. Note that, in the following description, in the subframes transmitted from TP #1 (connecting cell) and TP #2 (coordinated cell), two REs (IMRs) for interference signal estimation that neighbor each other in the time axis direction are assumed to be the first and second IMRs following the time axis direction.

[Formula 1]

$$\begin{cases} y_1 = h_1 X_{11} + h_2 X_{11} + n_1; \\ y_2 = h_1 X_{12} + h_2 X_{12} + n_2, \end{cases} \quad \text{(Equation 1)}$$

Note that, in equation 1, $X_{11}$ and $X_{12}$ are interference estimation reference signal symbols arranged in two interference measurement REs (IMRs) that neighbor each other in the time axis direction, in the subframes transmitted from TP #1 and TP #2 (see FIG. 3B). Also, $h_1$ is the channel fading from TP #1 to the UE, and $h_2$ is the channel fading from TP #2 to the UE. Also, $n_1$ and $n_2$ are the noise in the two interference measurement REs (IMRs) that neighbor each other in the time axis direction.

Also, interference power ($P_{12}$) apart from TP #1 and TP #2 (outside TP #1 and TP #2) can be represented by following equation 2.

[Formula 2]

$$P_{12} = \frac{1}{2}|y_1 X_{11}^* - y_2 X_{12}^*|^2 = \frac{1}{2}|n_1 X_{11}^* - n_2 X_{12}^*|^2 \quad \text{(Equation 2)}$$

In equation 2, $X^*_{11}$ and $X^*_{12}$ are the conjugates of $X_{11}$ and $X_{12}$, respectively. By multiplying $y_1$ by $X^*_{11}$, it is possible to remove the influence of $X_{11}$ from $y_1$, and adequately measure interference apart from the subject cell.

In this way, by arranging interference estimation reference signals in the same resources in subframes transmitted from TP #1 and TP #2, the user terminal is able to adequately calculate interference power apart from TP #1 and TP #2.

On the other hand, when CoMP is not applied in TP #1 and TP #2 (single cell transmission) (see FIG. 3C), the received signals ($y_1$ and $y_2$) of two REs (IMRs) that neighbor each other in the time axis direction can be represented by following equation 3.

[Formula 3]

$$\begin{cases} y_1 = h_1 X_{11} + h_2 X_{21} + n_1; \\ y_2 = h_1 X_{12} + h_2 X_{22} + n_2, \end{cases} \quad \text{(Equation 3)}$$

Note that, in equation 3, $X_{11}$ and $X_{12}$ are interference estimation reference signal symbols arranged in two interference measurement REs (IMRs) that neighbor each other in the time axis direction in the subframe transmitted from TP #1. $X_{21}$ and $X_{22}$ are interference estimation reference signal symbols arranged in two interference measurement REs (IMRs) that neighbor each other in the time axis direction in the subframe transmitted from TP #2. That is, $X_{11}$ and $X_{21}$ are arranged in the same RE, and $X_{12}$ and $X_{22}$ are arranged in the same RE. Also, $h_1$ is the channel fading from TP #1 to the user terminal, and $h_2$ is the channel fading from TP #2 to the user terminal. Also, $n_1$ and $n_2$ are the noise in two REs (IMRs) that neighbor each other in the time axis direction.

Also, interference power (interference power $P_1$ in TP #1) apart from TP #1 (outside TP #1) can be represented by following equation 4.

[Formula 4]

$$P_1 = \frac{1}{2}|y_1 X_{11}^* - y_2 X_{12}^*|^2 \quad \text{(Equation 4)}$$
$$= \frac{1}{2}|(X_{21} X_{11}^* - X_{22} X_{12}^*) \cdot h_2 + n_1 X_{11}^* - n_2 X_{12}^*|^2$$

In this way, by arranging interference estimation reference signals in the same resources in a plurality of transmission points (TP #1 and TP #2), it becomes possible to estimate interference signals of cells outside TP #1 and TP #2. Also, at this time, by transmitting the interference estimation reference signals by one antenna port in each transmission point, it is possible to reduce the signaling overhead.

Now, if the symbol sequences to constitute the interference estimation reference signals are the same between a plurality of transmission points (TP #1 and TP #2) or transmission point groups, the accuracy of interference estimation in the user terminal decreases.

The present inventors have found out that, in an environment where there are a large number of transmission points such as the Heterogeneous environment, there is a threat that the types of symbol sequences to constitute interference estimation reference signal are insufficient with the sequences of conventional reference signals alone (for example, the CSI-RS defined in LTE (Rel. 10)), and that there is therefore a possibility that the accuracy of interference estimation decreases, and also a possibility that the planning of interference estimation reference signal becomes complex, and arrived at inventing an interference estimation method that can secure many types of interference estimation reference signals at ease.

With the interference estimation method according to the present invention, interference is estimated using interference estimation reference signals to which different scrambling sequences are applied between transmission points (or between transmission point groups). By using a plurality of scrambling sequences, it becomes possible to generate many types of interference estimation reference signals, so that it is possible to reduce the planning effort of interference estimation reference signals in an environment with a large number of transmission points such as the Heterogeneous environment. Note that, in a communication system where the present invention is applied, the multiplexing positions of interference estimation reference signals may be multiplexed in different multiplexing positions between a plurality of transmission points (or transmission point groups). That is, it has only to be made possible to apply different scrambling sequences between transmission points (or between transmission point groups) when interference estimation reference signals are multiplexed in the same multiplexing positions (resources) between a plurality of transmission points (or transmission point groups).

Figure 4A:
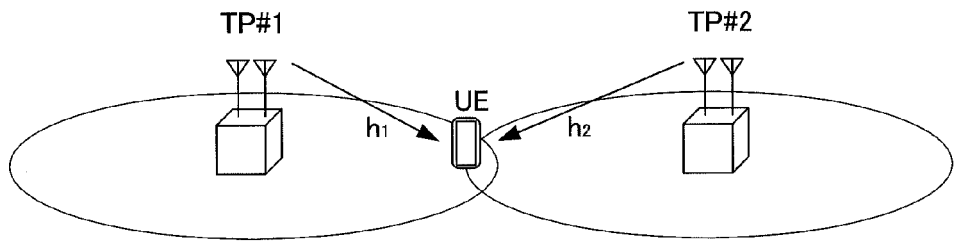
FIG. 4 provides diagrams to show examples of CSI-RS patterns including interference estimation reference signals to which different scrambling sequences are applied between a plurality of transmission points.
Figure 4B:
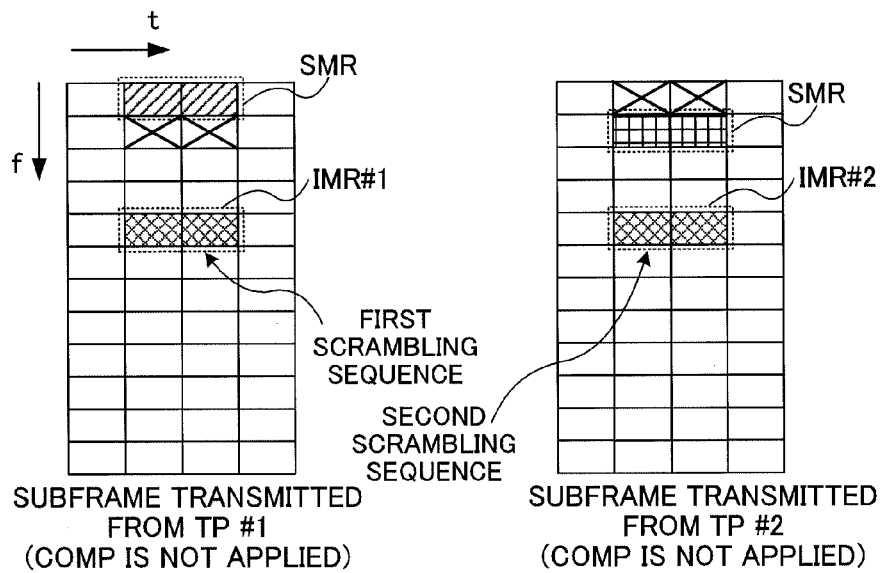
Figure 4C:
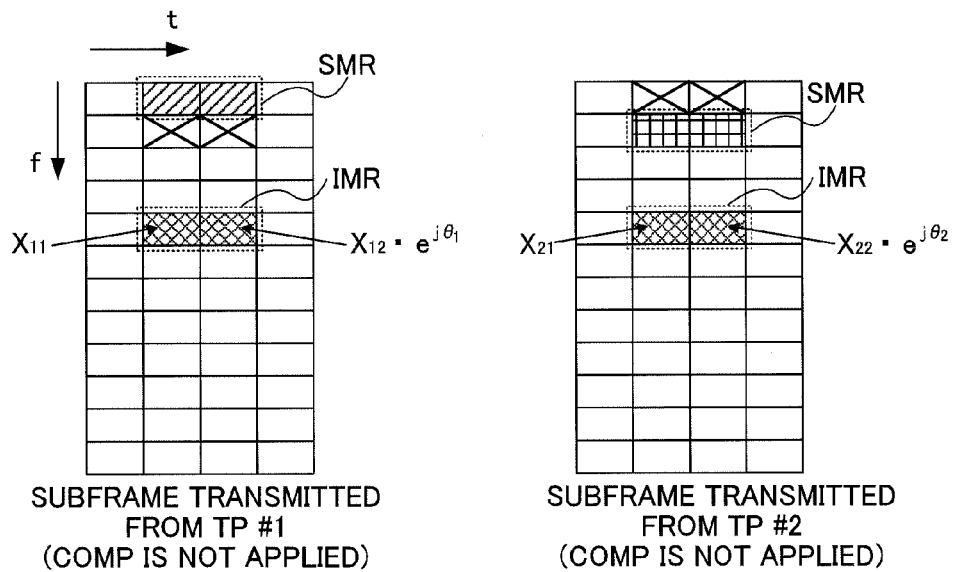

Now, the present embodiment will be described in detail below with reference to the accompanying drawings. FIG. 4 shows resource blocks, each being one resource block cut out from predetermined symbols (for example, the eighth to eleventh symbols) in FIG. 2, and shows examples of patterns in which interference estimation reference signals are arranged in the same resources between a plurality of transmission points. In FIGS. 4B and 4C, the subframes on the left side are the subframes to be transmitted from TP #1, and the subframes on the right side are the subframes to be transmitted from TP #2.

With the present embodiment, varying scrambling sequences are applied to the interference estimation reference signal symbols at different transmission points (TP #1 and TP #2). For example, the base station apparatus to serve as TP #1 controls the interference estimation reference signal symbols such that a scrambling sequence that is different from that of the base station apparatus to serve as TP #2 is applied.

To be more specific, the base station apparatus to serve as TP #1 allocates interference estimation reference signals to two resources (IMRs #1) that neighbor each other in the time axis direction, and applies a scrambling sequence, which is different from that of the base station apparatus to serve as TP #2, to the symbols of the interference estimation reference signals allocated to the two resources. For example, as shown in FIG. 4B, a first scrambling sequence is applied to two interference estimation reference signals (IMRs #1) that are consecutive in the time axis direction in the subframe to be transmitted from TP #1, and a second scrambling sequence that is different from the first scrambling sequence is applied to two interference estimation reference signals (IMRs #2) that are consecutive in the time axis direction in the subframe to be transmitted from TP #2.

Here, the process of generating interference estimation reference signals to which scrambling sequences are applied will be described in detail.

(Conventional Reference Signals+Scrambling Sequences)

Interference estimation reference signals may be generated by multiplying sequences of conventional reference signals (for example, CSI-RSs) by the scrambling sequences proposed herein. Varying types of interference estimation reference signals can be generated between transmission points (or between transmission point groups) by multiplying sequences of conventional reference signals by different scrambling sequences between transmission points (or between transmission point groups).

For example, as shown in FIG. 4B, in the subframe transmitted from TP #1, a sequence of conventional CSI-RSs is generated as two interference estimation reference signals that are consecutive in the time axis direction, and the first scrambling sequence is applied to the interference estimation reference signals formed with this conventional CSI-RS sequence. Furthermore, in the subframe transmitted from TP #2, a sequence of conventional CSI-RSs is generated as two interference estimation reference signals that are consecutive in the time axis direction, and a second scrambling sequence is applied to the interference estimation reference signals formed with this conventional CSI-RS sequence. As a result of this, it is possible to generate interference estimation reference signal to which varying scrambling sequences are applied between TP #1 and TP #2.

(Orthogonal Sequences+Non-Orthogonal Sequences)

Also, it is equally possible to generate interference estimation reference signal by multiplying orthogonal sequences or non-orthogonal sequences by scrambling sequences. Orthogonal sequences or non-orthogonal sequences are used as base sequences. For example, when combining an orthogonal sequence and a non-orthogonal sequence, the orthogonal sequence may be multiplied by the non-orthogonal sequence as a scrambling sequence.

It is also possible to use a sequence given by applying phase rotation to an interference estimation reference signal symbol as an orthogonal sequence. Varying amounts of phase rotation (phase shift length, phase rotation angle, etc.) are applied to the interference estimation reference signal symbols in different transmission points (TP #1 and TP #2). For example, as shown in FIG. 4C, in two interference estimation reference signal symbols that are consecutive in the time axis direction in the subframe to be transmitted from TP #1, the second interference estimation reference signal symbol ($X_{12}$) alone may be subjected to phase rotation through $\theta_1$. Also, in two interference estimation reference signal symbols that are consecutive in the time axis direction in the subframe to be transmitted from TP #2, the second interference estimation reference signal symbol ($X_{22}$) alone may be subjected to phase rotation through $\theta_2$.

In this case, the received signals ($y_1$ and $y_2$) of the two REs (IMRs) that neighbor each other in the time axis direction and that are used in interference signal estimation in the user terminal can be represented by following equation 5.

[Formula 5]

$$\begin{cases} y_1 = h_1 X_{11} + h_2 X_{21} + n_1; \\ y_2 = h_1 X_{12} \cdot e^{j\theta_1} + h_2 X_{22} \cdot e^{j\theta_2} + n_2, \end{cases} \quad \text{(Equation 5)}$$

Also, the amount of phase rotation may be changed between the interference estimation reference signal symbol ($X_{11}$) transmitted from TP #1 and the interference estimation reference signal symbol ($X_{21}$) transmitted from TP #2.

(Scrambling Sequences that Vary in the Time/Frequency Domain)

Also, interference estimation reference signals may be generated using scrambling sequences that vary in the time/frequency domain. For example, for a given user terminal UE, interference estimation reference signals may be generated by using varying scrambling sequences that are linked to subframe numbers in the time domain. By this means, interference estimation reference signals, to which scrambling sequences that vary in the time domain are applied, are generated.

(Variation of Scrambling Sequence Length)

As for scrambling sequences, scrambling may be carried out using a long scrambling sequence length that stretches over a plurality of RBs, or scrambling may be carried out using a scrambling sequence length confined within one RB. For example, as shown in FIG. 4C, when interference estimation reference signals (IMRs) per RB is formed with two symbols, a scrambling sequence length that is six symbols long is applied to the interference estimation reference signal symbols that stretch over three RBs (2×3=6 symbols). Alternatively, as shown in FIG. 4C, when interference estimation reference signal per RB is formed with two symbols, a scrambling sequence length that is two symbols long is applied to the interference estimation reference signal symbols (two symbols) of one RB.

Here, for base sequences, a Walsh-Hadamard sequence, an orthogonal M sequence, and a phase rotation sequence may be used as an orthogonal sequence, and CAZAC code (a Zadoff-Chu sequence, a Frank sequence and so on), PN code (an M sequence, a Gold sequence and so on), Truncated PN code, Golay code and so on may be used as a non-orthogonal sequence. Also, either of the orthogonal sequence and the non-orthogonal sequence above may be used as a scrambling sequence.

(Interference Estimation Reference Signal Multiplexing Positions)

Next, the multiplexing positions of interference estimation reference signals to which varying scrambling sequences are applied between transmission points (or between transmission point groups) will be described.

The multiplexing positions of interference estimation reference signals proposed herein may belong to the multiplexing pattern of conventional reference signals (for example, CSI-RSs) or belong to part of that multiplexing pattern, or may assume a multiplexing pattern in which arrangement is made on a random basis in the data region, which is PDSCH resources. Also, the multiplexing positions of interference estimation reference signals may assume different multiplexing positions from those of another transmission point or between a plurality of other transmission points (or transmission point groups), or may assume the same multiplexing positions between a plurality of transmission points (or transmission point groups). In this case, in order to apply varying scrambling sequences between transmission points (or between transmission point groups), varying scrambling sequences are applied to the interference estimation reference signals of a plurality of transmission points (or transmission point groups) that are multiplexed in the same multiplexing positions.

For example, when the interference estimation reference signals proposed herein are multiplexed in a region belonging to a multiplexing pattern of conventional CSI-RSs, in downlink communication with a user terminal that supports the conventional CSI-RS defined in LTE-A (Rel. 10) but that does not support the interference estimation reference signals proposed herein (hereinafter "conventional terminal (Rel. 10)"), the interference estimation reference signal multiplexing positions may be reported as zero-power CSI-RSs, so that the conventional terminal (Rel. 10) is able to identify the interference estimation reference signals which the conventional terminal (Rel. 10) does not support, as zero-power CSI-RSs, and is capable of data demodulation by excluding the interference estimation reference signals, so that it is possible to prevent the accuracy of data demodulation from deteriorating.

Now, the variation of the multiplexing positions of interference estimation reference signals will be described in detail. In the example shown in FIG. 5, transmission points TP #1 and TP #2 arrange interference estimation reference signals in resources that do not overlap with conventional CSI-RSs in one resource block. The interference estimation reference signals are not used in channel state measurement for conventional CSI-RSs, and therefore can be arranged freely in resources that do not overlap with conventional CSI-RSs. When used in interference measurement alone, interference estimation reference signals may be referred to as "interference measurement-dedicated CSI-RSs."

Figure 5:
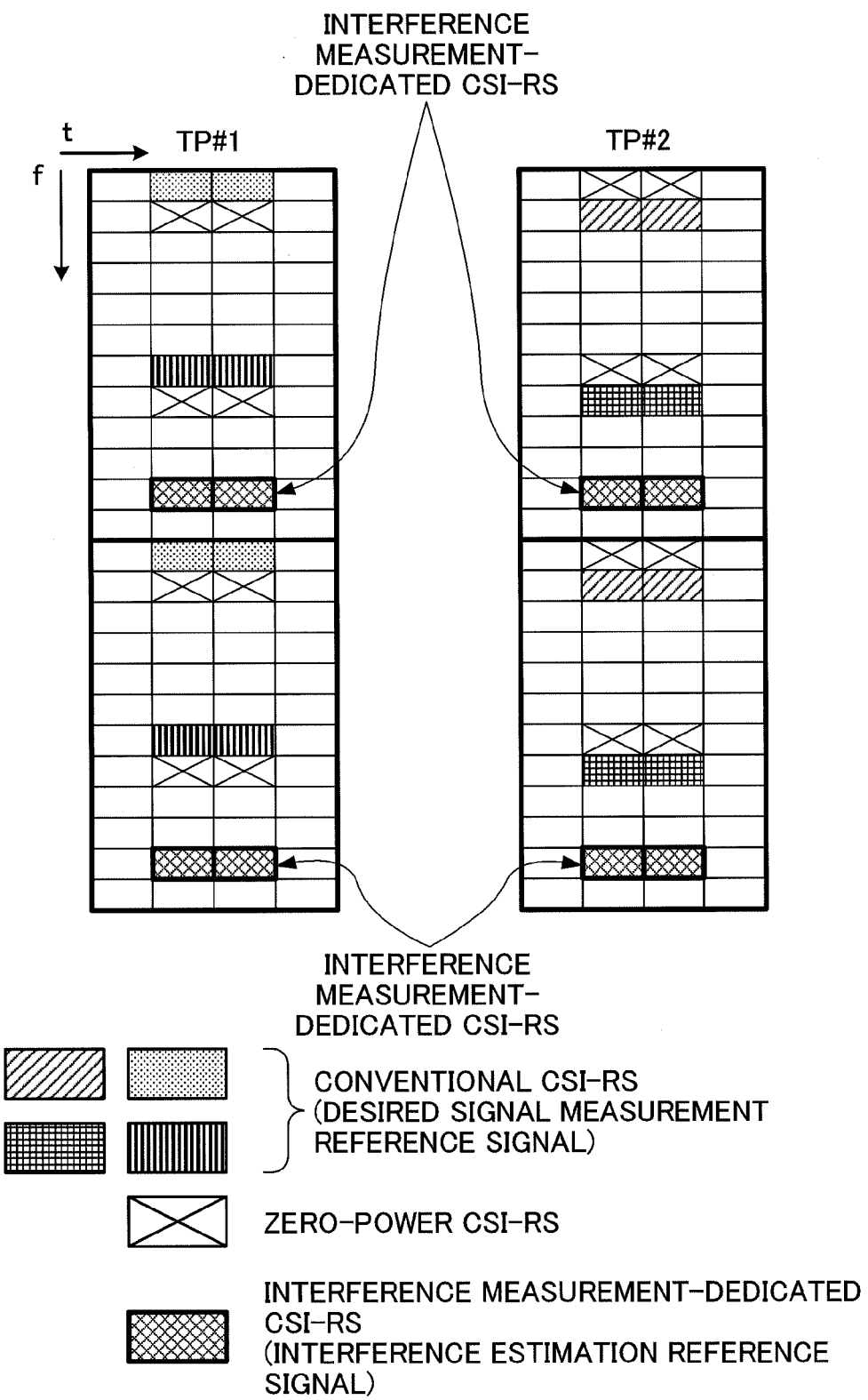
FIG. 5 is a diagram to show a CSI-RS pattern including interference estimation reference signals.

In the example shown in FIG. 5, interference estimation reference signals are arranged in the same resources between transmission point TP #1 and transmission point TP #2. By generating sequences of interference estimation reference signals, to which varying scrambling sequences are applied for varying transmission points or user terminals, a user terminal is capable of executing code-demultiplexing even when interference estimation reference signals from multiple transmission points TP #1 and TP #2 are combined. Also, it is equally possible to apply shift in the frequency axis direction so that the resources of the interference estimation reference signals do not overlap between transmission points. In this case, it is possible to prevent the patterns of the interference estimation reference signals from overlapping between neighboring transmission points, by changing the amount of shift (the number of resource elements) for the interference estimation reference signals.

Interference estimation reference signal resources are signaled to conventional terminals (Rel. 10), as zero-power CSI-RSs, via higher layer signaling.

To support terminals that support the interference estimation reference signals among the user terminals connected to TP #1, the base station apparatus (TP #1) to constitute transmission point #1 reports resource information of the interference estimation reference signals shown in FIG. 5 through higher layer signaling, reports resource information of conventional CSI-RSs to conventional terminals (Rel. 10) through higher layer signaling, and furthermore reports the resources of the interference estimation reference signals as zero-power CSI-RSs through higher layer signaling.

Upon receiving the report of the interference estimation reference signals, the support terminals specify and receive the interference estimation reference signal resources, measure interference using both the interference estimation reference signals and conventional CSI-RSs, and measure the channel state using conventional CSI-RSs. In the interference measurement using conventional CSI-RSs, interference is measured by separating the CSI-RSs transmitted from connecting transmission point TP #1 and the CSI-RSs transmitted from other transmission points (in FIG. 5, other transmission points apart from TP #2).

The resources of interference estimation reference signals are reported to conventional terminals (Rel. 10) as zero-power CSI-RSs. As a result of this, the resources where the interference estimation reference signals are arranged are identified as zero-power CSI-RSs, and the interference estimation reference signal resources are excluded from data demodulation.

Figure 6:
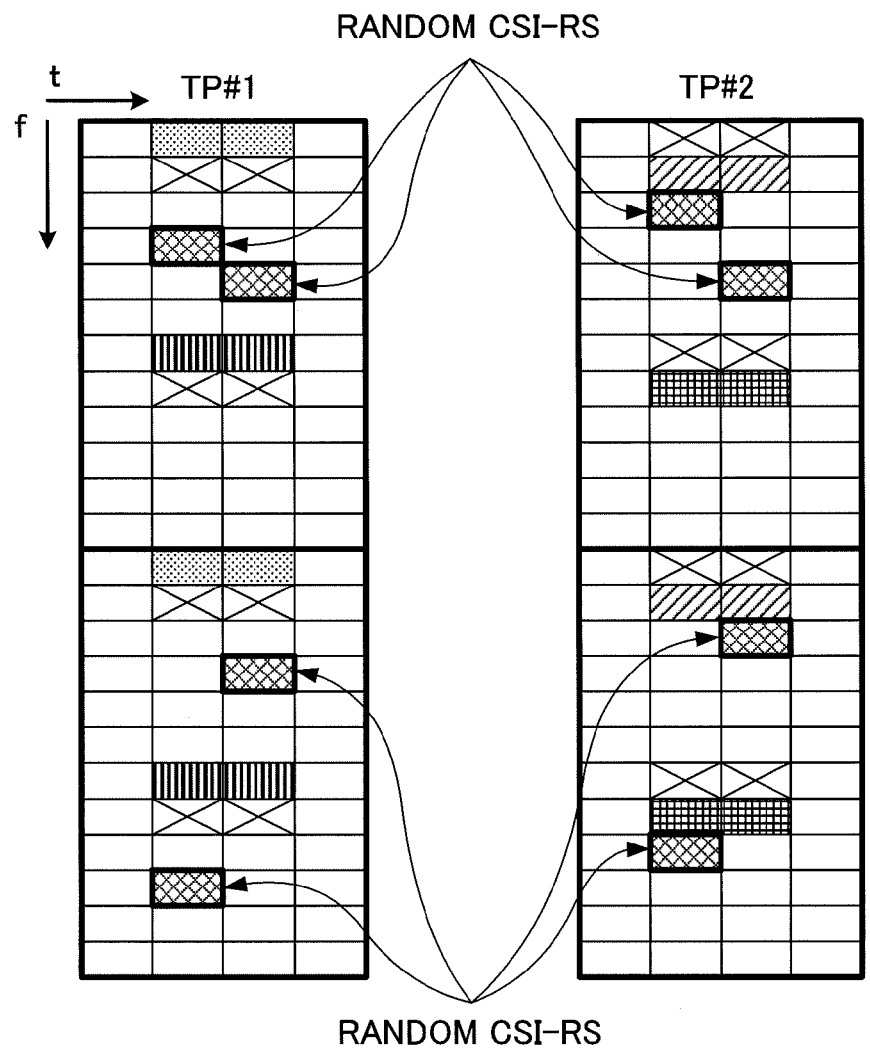
FIG. 6 is a diagram to show a CSI-RS pattern including random CSI-RSs.

The example shown in FIG. 6 is designed such that, in a region where conventional CSI-RSs can be arranged, interference estimation reference signal in resource element units (hereinafter "random CSI-RSs") are randomly arranged (hopped).

In this way, even when a random CSI-RS-based interference measurement method is applied, it is possible to increase the number of patterns that can be used in interference estimation, and, furthermore, given that the random CSI-RSs are non-zero-power CSI-RSs, it is possible to increase the number of interference estimation reference signals, and increase the number of reference signals for channel state measurement for CSI.

The base station apparatus (TP #1) to constitute transmission point #1 reports setting information of the random CSI-RSs shown in FIG. 6 to support terminals that support the random CSI-RSs among the user terminals that are connected to TP #1, through higher layer signaling, reports setting information of conventional CSI-RSs to conventional terminals (Rel. 10) through higher layer signaling, and reports the random CSI-RSs as zero-power CSI-RSs through higher layer signaling.

Random CSI-RSs are reported to the support terminals using, for example, RRC signaling. Interference is measured using the random CSI-RSs and conventional CSI-RSs that are reported, and the channel state is measured using the conventional CSI-RSs.

The resources allocated to the random CSI-RSs are reported to the conventional terminals (Rel. 10) as zero-power CSI-RSs. The conventional terminals (Rel. 10) carry out data demodulation by excluding the random CSI-RSs.

Figure 7:
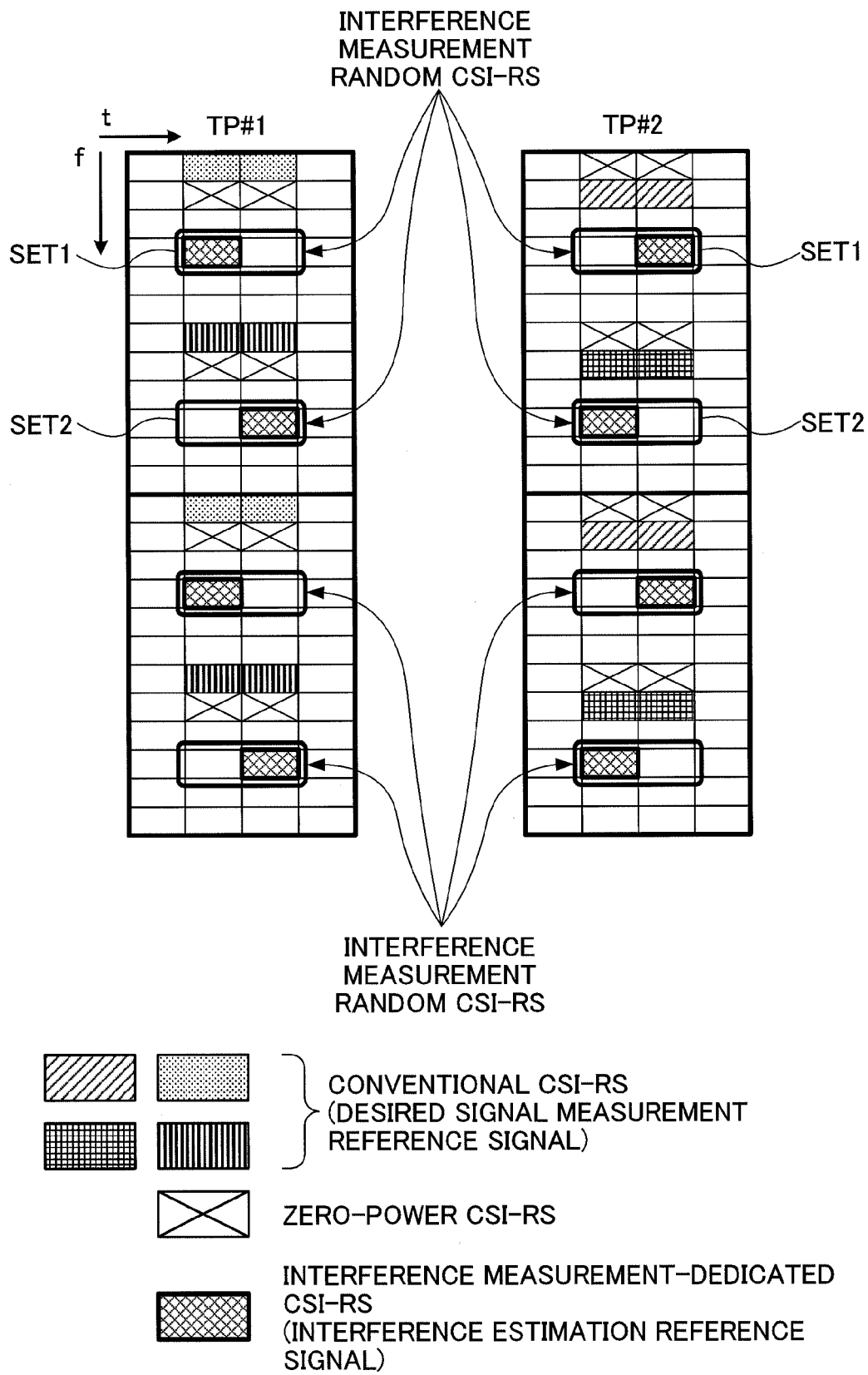
FIG. 7 is a diagram to show a CSI-RS pattern including the same random CSI-RSs between transmission points.

In the example shown in FIG. 7, the same interference measurement random CSI-RS pattern is used between transmission points. The interference measurement random CSI-RSs are allocated to two resource elements that are formed with two consecutive symbols of the same frequency, and one interference measurement random CSI-RS is allocated to one of the two resource elements for one transmission point, and a zero-power CSI-RS is allocated to the other resource element. Also, one interference measurement random CSI-RS is allocated to the other one of the two resource elements for the other transmission point, and a zero-power CSI-RS is allocated to the other resource element. For the conventional terminals (Rel. 10), sets of the resource elements (two resource elements) where the interference measurement random CSI-RSs are allocated such as SET 1, SET 2 . . . , are reported as zero-power CSI-RSs.

By this means, it is possible to report interference measurement random CSI-RSs to conventional terminals (Rel. 10) using conventional patterns, and prevent the accuracy of data demodulation from deteriorating.

In transmission point TP #1, in one resource block, interference measurement random CSI-RSs are arranged in resource element sets SET 1 and SET 2, and in resource element set SET 1, the right element is designated as an interference measurement random CSI-RS, and, in resource element set SET 2, the left element is designated as an interference measurement random CSI-RS.

In transmission point TP #2, interference measurement random CSI-RSs are arranged in the same pattern as in transmission point TP #1. However, between the transmission points, the positions of random holes are made orthogonal (that is, the left and right are arranged opposite). That is, in one resource block, interference measurement random CSI-RSs are arranged in resource element sets SET 1 and SET 2, and, in resource element set SET 1, the left element is designated as an interference measurement random CSI-RS, and in resource element set SET 2, the right element is designated as an interference measurement random CSI-RS.

The base station apparatus to constitute transmission point TP #1 signals the interference measurement random CSI-RS pattern shown in FIG. 7 to support terminals connected to the base station apparatus through higher layer signaling. The base station apparatus may furthermore report the positions of the interference measurement random CSI-RSs (the left and right positions in resource element sets SET) through higher layer signaling, or may report only the positions of the interference measurement random CSI-RSs through higher layer signaling (the left and right positions in resource element sets SET). In the present example, interference measurement random CSI-RS pattern information and interference measurement random CSI-RS position information are reported. Alternatively, a new pattern, which can specify not only the arrangement pattern of interference measurement random CSI-RSs but also the positions of interference measurement random CSI-RSs, may also be defined as well. The base station apparatus reports setting information of conventional CSI-RSs to conventional terminals (Rel. 10) through higher layer signaling, and reports interference measurement random CSI-RSs as zero-power CSI-RSs through higher layer signaling. The interference measurement random CSI-RSs are based on the CSI-RS pattern (4 ports) defined in LTE-A (Rel. 10), which is also used in signaling of zero-power CSI-RSs as well.

By this means, even if interference measurement random CSI-RSs are set in resource element units, unreliable resources that may not be demodulated correctly are reported by a signaling method that is supported, so that conventional terminals (Rel. 10) are able to prevent the accuracy of data demodulation from deteriorating.

(Reporting of Scrambling Sequences)

The base station apparatus has the function of reporting information related to scrambling sequences, by which base sequences are multiplied to generate interference estimation reference signals (or combinations of base sequences and scrambling sequences), to a user terminal.

The user terminal has a sequence specifying section, which memorizes the information of scrambling sequences reported from the base station apparatus (or combinations of base sequences and scrambling sequences) in memory, and specifies the sequence of the scrambling sequences transmitted from each transmission point (or combinations of base sequences and scrambling sequences). The sequence specifying section allows accurate interference estimation reference signal sequence detection.

For example, the base station apparatus reports the information of scrambling sequences (or combinations of base sequences and scrambling sequences) to the user terminal by means of higher layer signaling (for example, by RRC signaling) or broadcast signals and so on. In this case, the base station apparatus may apply a table in which scrambling sequences (or combinations of base sequences and scrambling sequences) and bit values are associated with each other, or may signal information about scrambling sequences (or combinations of base sequences and scrambling sequences).

If the base station apparatus and the user terminal have tables of the same contents, the user terminal is able to specify the sequence of interference estimation reference signals transmitted from each transmission point, from the information reported through RRC signaling, broadcast signals and so on.

FIG. 8 shows a configuration example of a table in which scrambling sequences and bit values are associated with each other. In the table shown in this drawing, for example, bit data (00), (01) and (10) are mapped in association with three types of scrambling sequences. For example, when an interference estimation signal is generated by multiplying a base sequence by a scrambling sequence 1, bit data (00) is signaled as information related to scrambling sequence 1. The scrambling sequences to be defined in the table are by no means limited to three types of scrambling sequences, and it is equally possible to use a table representing a plurality of arbitrary types of scrambling sequences (or combinations of base sequences and scrambling sequences).

Also, when information related to scrambling sequences (or combinations of base sequences and scrambling sequences) is reported from a base station apparatus to a user terminal by using higher layer signaling (for example, RRC signaling) or broadcast signals and so on, it is possible to report different scrambling sequences (or combinations of base sequences and scrambling sequences) to the user terminal on a per base station apparatus basis. Alternatively, it is also possible to report scrambling sequences (or combinations of base sequences and scrambling sequences) that are set such that every group formed with a plurality of base station apparatuses uses a different scrambling sequence (or combinations of base sequences and scrambling sequences), to the user terminal.

Also, when transmitting interference estimation reference signals, the base station apparatus may report information (CSI-RS-Config) to represent transmission parameters for specifying the reference signals (the positions, sequences (scrambling sequences (or combinations of base sequences and scrambling sequences)), transmission power and so on), to the user terminal, through higher layer signaling (RRC signaling).

(Control of Scrambling Sequences)

The base station apparatus is also able to associate (link) scrambling sequences (or combinations of base sequences and scrambling sequences) with information that is specific to each transmission point (or a plurality of transmission point groups), and control the scrambling sequences (or combinations of base sequences and scrambling sequences) of interference estimation reference signals.

For example, when the cell IDs (or virtual cell IDs) of a plurality of transmission points vary, it is possible to define the scrambling sequences (or combinations of base sequences and scrambling sequences) in association with the cell ID (or the virtual cell ID) of each transmission point.

Here, the virtual cell IDs may be values that are generated from user-specific parameters (for example, the user-specific parameter A in the generation equation of initialized pseudo-random sequences of CSI-RSs (following equation 6)) reported through higher layer signaling (RRC signaling) in the generation of initialized pseudo-random sequence of reference signals (for example, CSI-RSs and DM-RSs).

[Formula 6]

$$c_{init}=2^{10}\cdot(7\cdot(n_s+1)+l+1)\cdot(2\cdot A+1)+2\cdot A+N_{CP} \quad \text{(Equation 6)}$$

$n_s$: the slot number in a radio frame;
l: the OFDM symbol number in a slot; and $$N_{CP} = \begin{cases} 1 & \text{for normal } CP \\ 0 & \text{for extended } CP \end{cases}$$

For example, when the cell IDs of TPs #1, #2 and #3 are 1, 2 and 3, respectively, the base station apparatus of cell ID=1 controls scrambling sequence #1, the base station apparatus of cell ID=2 controls scrambling sequence #2, and the base station apparatus of cell ID=3 controls scrambling sequence #3. In this case, the user terminal is able to specify the scrambling sequences of the interference estimation reference signals transmitted from each transmission point based on the cell IDs.

Also, when CoMP is applied, CoMP set-specific information (CoMP set identification information and so on) and scrambling sequences (or combinations of base sequences and scrambling sequences) may be defined in association with each other. The CoMP set is formed with combinations of a plurality of cells that carry out CoMP joint transmission.

In addition, a base station apparatus is able to associate (link) CSI-RS patterns and scrambling sequences (or combinations of base sequences and scrambling sequences) with each other and control these. For example, with interference estimation reference signals that are transmitted from each transmission point, the mapping positions of the interference estimation reference signals and predetermined scrambling sequences (or combinations of base sequences and scrambling sequences) may be associated (linked).

Also, a base station apparatus is able to associate (link) the IDs of user terminals (UEIDs) and scrambling sequences (or combinations of base sequences and scrambling sequences) with each other and control these. In this case, the base station apparatus is able to determine the scrambling sequences of the interference estimation reference signals (or combinations of base sequences and scrambling sequences) using an equation in which scrambling sequences (or combinations of base sequences and scrambling sequences) and UEIDs are associated with each other.

Here, the method of channel estimation that is used in a user terminal when interference estimation reference signals are arranged in addition to desired signal measurement CSI-RSs will be described.

Figure 9B:
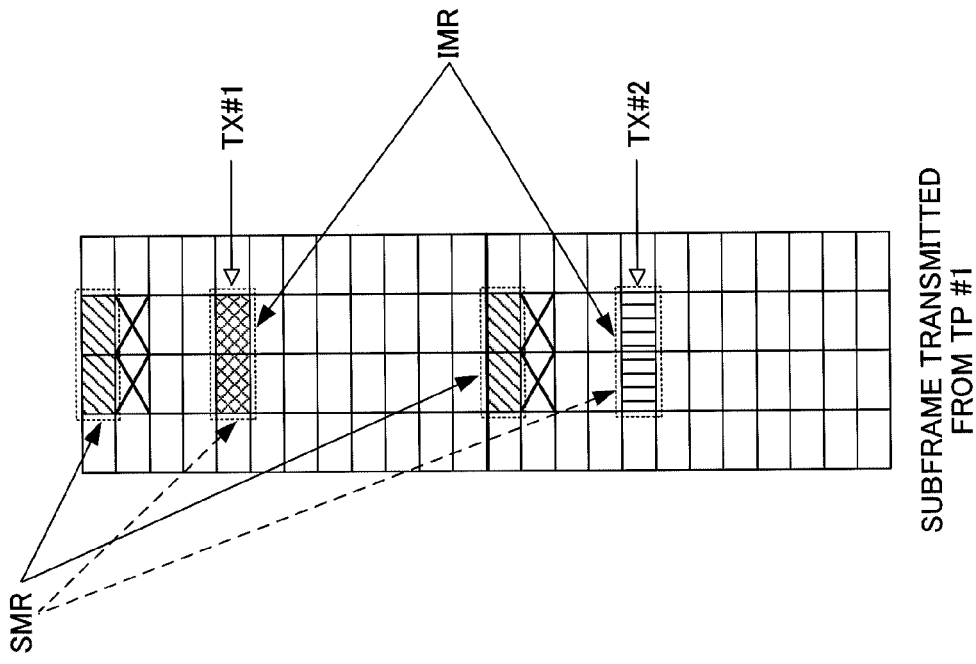
FIG. 9 provides diagrams to show examples of CSI-RS patterns including interference estimation reference signals.
Figure 9A:
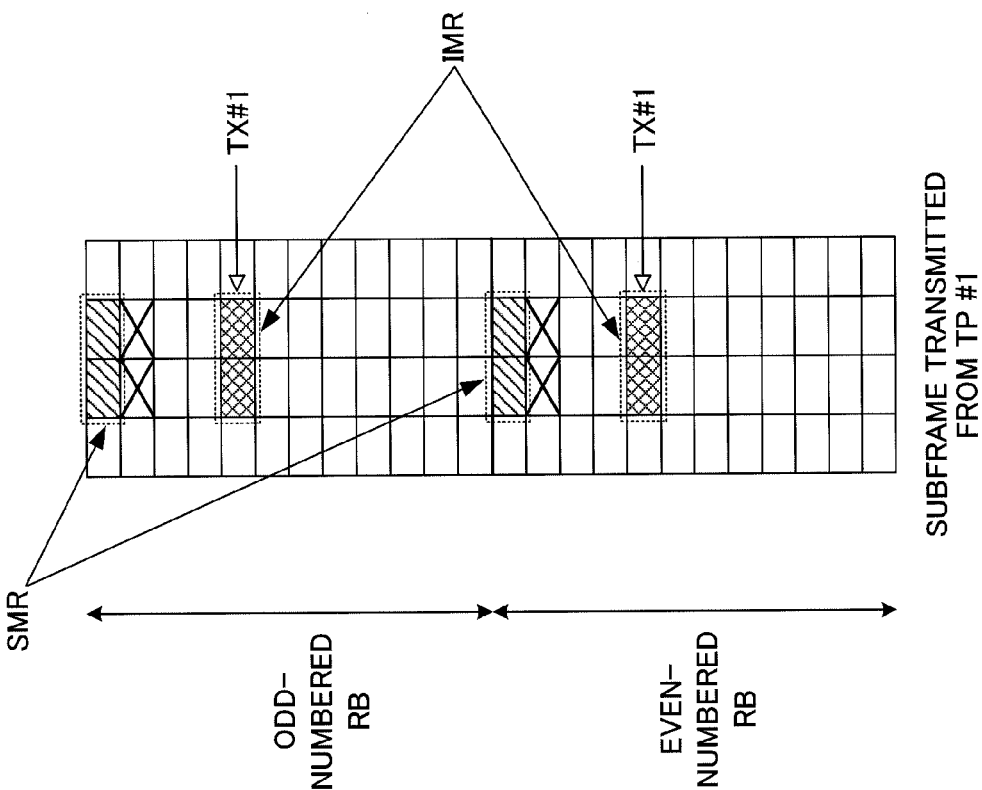

As shown in FIG. 9A, when REs (SMRs) for measuring desired signals and REs (IMRs) for measuring interference are provided in a predetermined subframe, it is possible to transmit interference estimation reference signals to the REs (IMRs) for interference signals from one antenna port (for example, the first antenna port (Tx #1)) and mute the second antenna port (Tx #2).

In this case, to estimate desired signals, there is a method to perform channel estimation based on the desired signal measurement REs (SMRs) alone. For example, it is possible to carry out channel estimation by means of minimum mean squared error (MMSE), based on the desired signal measurement REs (SMRs) alone. For example, it is possible to carry out channel estimation in accordance with following equation 7.

[Formula 7]

$$G = R_{SMR}\left(R_{SMR} + \begin{bmatrix} \frac{1}{SINR_{SMR}} & & \\ & \ddots & \\ & & \frac{1}{SINR_{SMR}} \end{bmatrix}\right)^{-1} \quad \text{(Equation 7)}$$

$R_{SMR}$: autocorrelation matrix of desired signal measurement REs (SMRs); and $SINR_{SMR}$: SINR of desired signal measurement REs (SMRs).

Also, with the present embodiment, as shown in FIG. 9B, CSI-RSs are transmitted from the first antenna port (Tx #1) to the interference measurement REs (IMRs) in odd-numbered resource blocks (RBs), and the second antenna port (Tx #2) is muted. Then, by transmitting CSI-RSs from the second antenna port (Tx #2) to the REs (IMRs) for interference signals in even-numbered RBs, the first antenna port (Tx #1) can be muted.

In this case, in estimation of desired signals, it is possible to carry out minimum mean squared error (MMSE)-based channel estimation taking into account interference measurement REs (IMRs) in addition to desired signal measurement REs (SMRs) (based on desired signal measurement REs (SMRs) and interference measurement REs (IMRs)). For example, channel estimation may be performed in accordance with following equation 8.

[Formula 8]

$$G_{enhanced} = R_{SMR+IMR}\left(R_{SMR+IMR} + \begin{bmatrix} \frac{1}{SINR_{SMR}} & & & & \\ & \ddots & & & \\ & & \frac{1}{SINR_{SMR}} & & \\ & & & \frac{1}{SINR_{IMR}} & \\ & & & & \ddots \\ & & & & & \frac{1}{SINR_{IMR}} \end{bmatrix}\right)^{-1} \quad \text{(Equation 8)}$$

$R_{SMR+IMR}$: autocorrelation matrix of desired signal measurement REs (SMRs) and interference measurement REs (IMRs);

$SINR_{SMR}$: SINR of desired signal measurement REs (SMRs); and $SINR_{IMR}$: SINR of interference estimation REs (IMRs).

In this way, a user terminal is able to carry out CQI measurement and PMI selection based on the result of performing channel estimation based on desired signal measurement REs (SMRs) and interference measurement REs (IMRs). In this way, by performing channel estimation considering interference measurement REs, it becomes possible to improve the accuracy of CQI measurement in user terminals. Note that user terminals are able to combine and apply the above first example and second example.

(Configuration of Radio Communication System)

Figure 10:
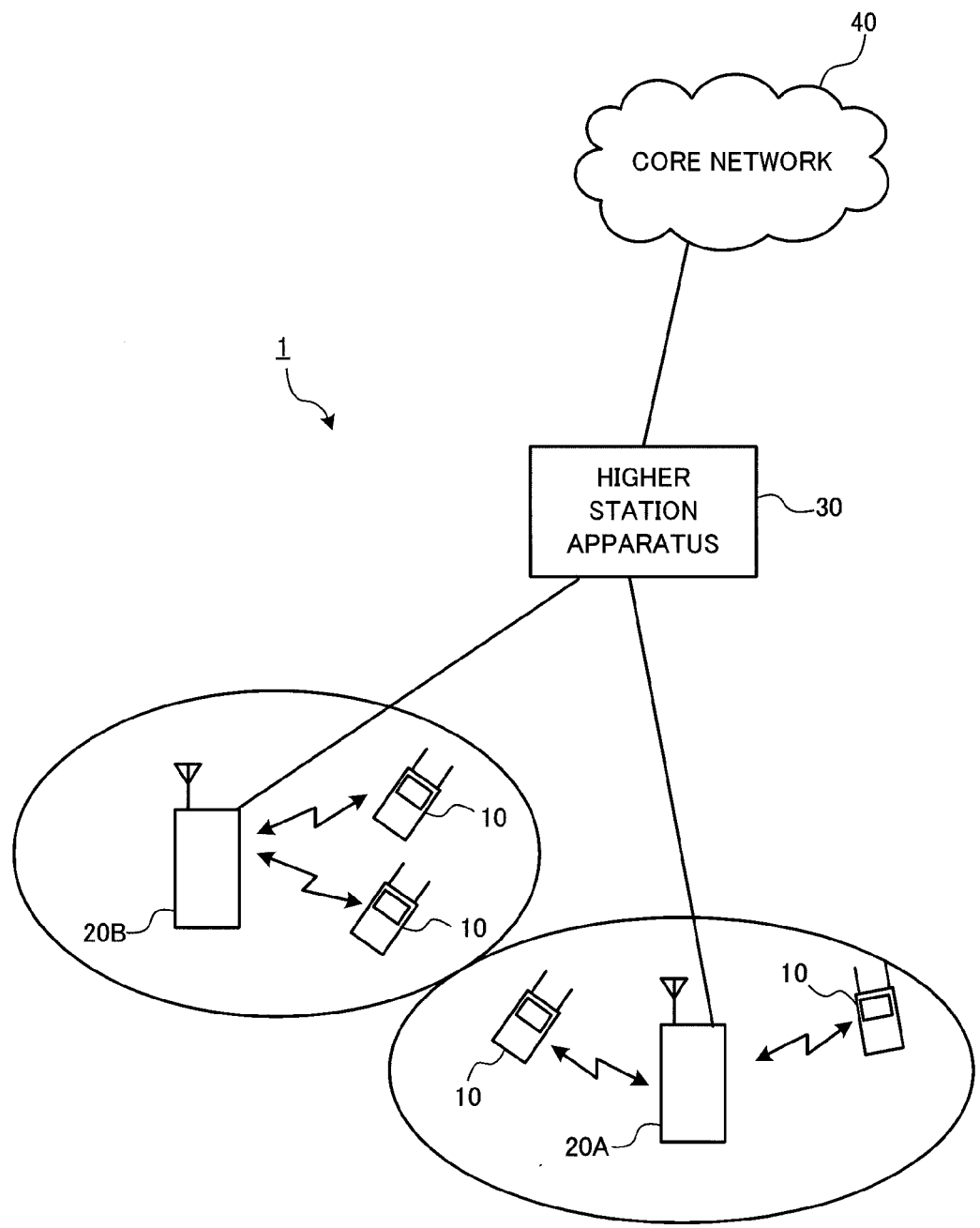
FIG. 10 is a diagram to explain a system configuration of a radio communication system.

Now, a radio communication system according to the present embodiment will be described in detail. FIG. 10 is a diagram to explain a system configuration of a radio communication system according to the present embodiment. Note that the radio communication system shown in FIG. 10 is a system to accommodate, for example, the LTE system or SUPER 3G. In this radio communication system, carrier aggregation to group a plurality of fundamental frequency blocks into one, where the system band of the LTE system is one unit, is used. Also, this radio communication system may be referred to as "IMT-Advanced" or may be referred to as "4G."

As shown in FIG. 10, a radio communication system 1 is configured to include base station apparatuses 20A and 20B of individual transmission points, and user terminals 10 that communicate with these base station apparatuses 20A and 20B via radio links. The base station apparatuses 20A and 20B are connected with a higher station apparatus 30, and this higher station apparatus 30 is connected with a core network 40. Also, the base station apparatuses 20A and 20B are connected with each other by wire connection or by wireless connection through a backhaul link. The user terminals 10 are able to communicate with the base station apparatuses 20A and 20B, which serve as a plurality of transmission points. Note that the higher station apparatus 30 may be, for example, an access gateway apparatus, a radio network controller (RNC), a mobility management entity (MME) and so on, but is by no means limited to these.

Although the user terminals 10 may include conventional terminals (Rel. 10 LTE) and support terminals (for example, Rel. 11 LTE), the following description will be given simply with respect to "user terminals," unless specified otherwise. Also, for ease of explanation, the user terminals 10 will be described to perform radio communication with the base station apparatuses 20A and 20B.

In the radio communication system 1, for radio access schemes, OFDMA (Orthogonal Frequency Division Multiple Access) is adopted on the downlink, and SC-FDMA (Single- Carrier Frequency Division Multiple Access) is adopted on the uplink, but the uplink radio access scheme is by no means limited to this. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, the system band into bands formed with one or continuous resource blocks, and allowing a plurality of terminals to use mutually different bands.

Here, communication channels will be described. Downlink communication channels include a PDSCH (Physical Downlink Shared Channel), which is used by user terminals 10 on a shared basis, as a downlink data channel, and downlink L1/L2 control channels (PDCCH, PCFICH, and PHICH). Transmission data and higher control information are transmitted by the PDSCH. PDSCH and PUSCH scheduling information and so on are transmitted by the PDCCH (Physical Downlink Control Channel). The number of OFDM symbols to use for the PDCCH is transmitted by the PCFICH (Physical Control Format Indicator Channel). HARQ ACK and NACK for the PUSCH are transmitted by the PHICH (Physical Hybrid-ARQ Indicator Channel).

Uplink communication channels include a PUSCH (Physical Uplink Shared Channel), which is used by each user terminal on a shared basis as an uplink data channel, and a PUCCH (Physical Uplink Control Channel), which is an uplink control channel. By means of this PUSCH, transmission data and higher control information are transmitted. Also, by means of the PUCCH, downlink channel state information (CSI (including CQI and/or the like)), ACK/NACK and so on are transmitted.

Figure 11:
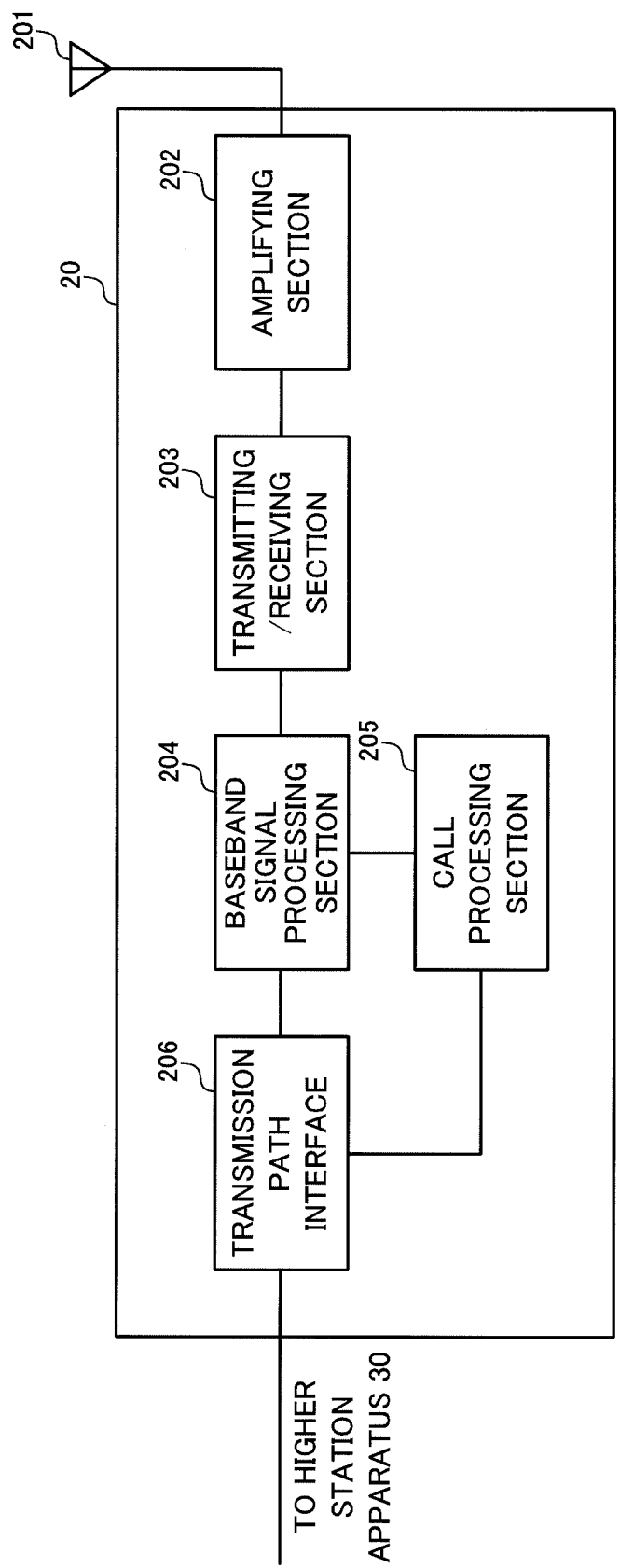
FIG. 11 is a diagram to explain an overall configuration of a base station apparatus.

An overall configuration of a base station apparatus according to the present embodiment will be described with reference to FIG. 11. Note that the base station apparatuses 20A and 20B have the same configuration and therefore will be described as "base station apparatus 20." The base station apparatus 20 includes a transmitting/receiving antenna 201, an amplifying section 202, a transmitting/receiving section (reporting section) 203, a baseband signal processing section 204, a call processing section 205, and a transmission path interface 206. Transmission data to be transmitted from the base station apparatus 20 to the user terminal on the downlink is input from the higher station apparatus 30, into the baseband signal processing section 204, via the transmission path interface 206.

In the baseband signal processing section 204, a signal of a downlink data channel is subjected to a PDCP layer process, division and coupling of transmission data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process, and a precoding process. Furthermore, a signal of a physical downlink control channel, which is a downlink control channel, is also subjected to transmission processes such as channel coding and an inverse fast Fourier transform.

Also, the baseband signal processing section 204 reports control information for allowing each user terminal 10 to perform radio communication with the base station apparatus 20, to the user terminals 10 connected to the same transmission point, through a broadcast channel. Information for communication in the transmission point includes, for example, the uplink or downlink system bandwidth, root sequence identification information (root sequence index) for generating random access preamble signals in the PRACH (Physical Random Access Channel), and so on.

A baseband signal that is output from the baseband signal processing section 204 is converted into a radio frequency band in the transmitting/receiving section 203. The amplifying section 202 amplifies the radio frequency signal having been subjected to frequency conversion, and outputs the result to the transmitting/receiving antenna 201.

Meanwhile, as for signals to be transmitted from the user terminal 10 to the base station apparatus 20 on the uplink, a radio frequency signal received by the transmitting/receiving antenna 201 is amplified in the amplifying section 202, converted into a baseband signal through frequency conversion in the transmitting/receiving section 203, and input in the baseband signal processing section 204.

The baseband signal processing section 204 performs an FFT process, an IDFT process, error correction decoding, a MAC retransmission control receiving process, and RLC layer and PDCP layer receiving processes of the transmission data that is included in the baseband signal received on the uplink. The decoded signal is transferred to the higher station apparatus 30 through the transmission path interface 206.

The call processing section 205 performs call processing such as setting up and releasing communication channels, manages the state of the base station apparatus 20 and manages the radio resources.

Next, an overall configuration of a user terminal according to the present embodiment will be described with reference to FIG. 12. A user terminal 10 has a transmitting/receiving antenna 101, an amplifying section 102, a transmitting/receiving section (receiving section) 103, a baseband signal processing section 104, and an application section 105.

As for downlink data, a radio frequency signal that is received in the transmitting/receiving antenna 101 is amplified in the amplifying section 102, and subjected to frequency conversion and converted into a baseband signal in the transmitting/receiving section 103. This baseband signal is subjected to receiving processes such as an FFT process, error correction decoding and retransmission control, in the baseband signal processing section 104. In this downlink data, downlink transmission data is transferred to the application section 105. The application section 105 performs processes related to higher layers above the physical layer and the MAC layer. Also, in the downlink data, broadcast information is also transferred to the application section 105.

Meanwhile, uplink transmission data is input from the application section 105 into the baseband signal processing section 104. The baseband signal processing section 104 performs a mapping process, a retransmission control (HARQ) transmission process, channel coding, a DFT process, and an IFFT process. The baseband signal that is output from the baseband signal processing section 104 is converted into a radio frequency band in the transmitting/receiving section 103. After that, the amplifying section 102 amplifies the radio frequency signal having been subjected to frequency conversion, and transmits the result from the transmitting/receiving antenna 101.

Figure 13:
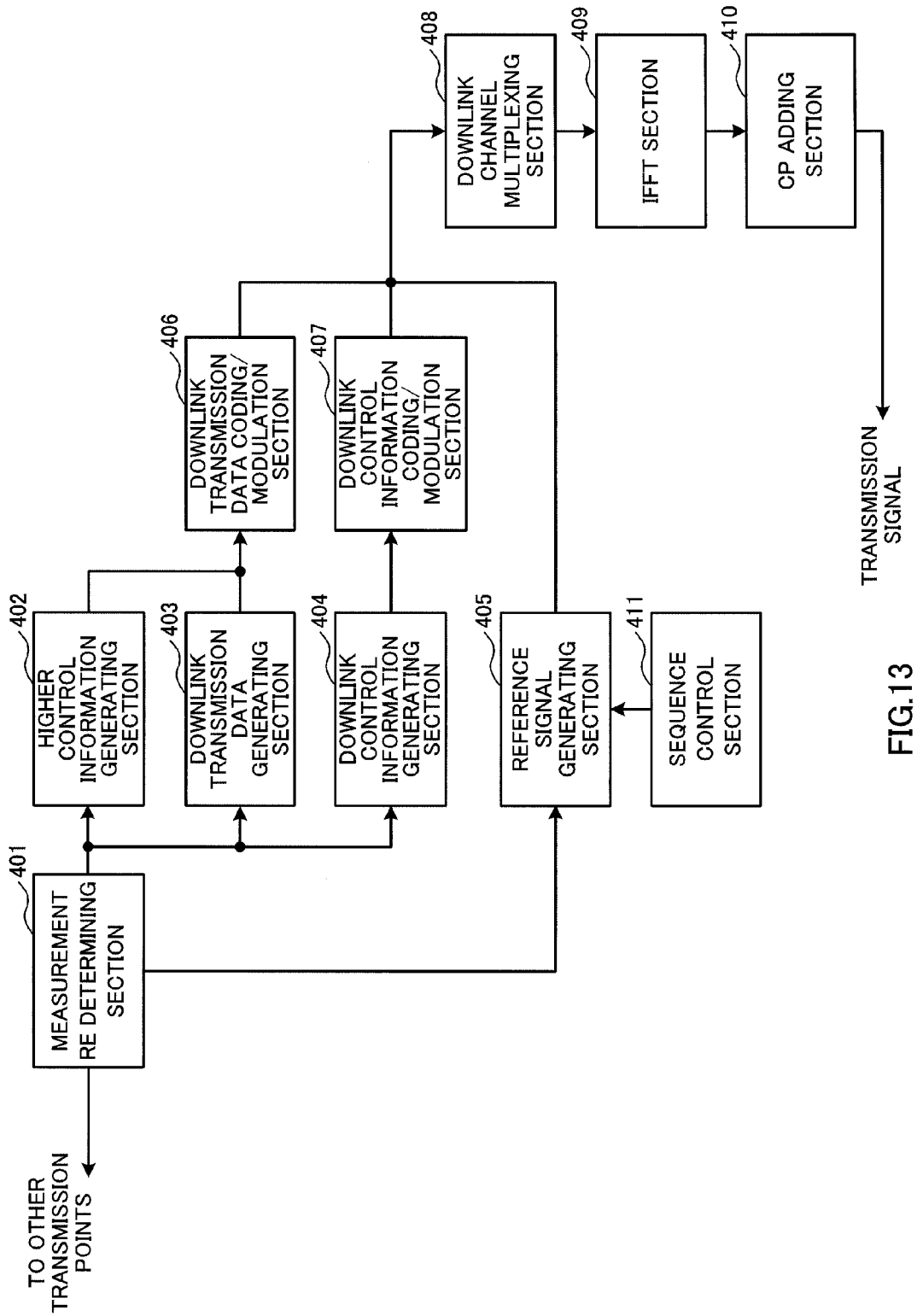
FIG. 13 is a functional block diagram of a base station apparatus.

Now, the function blocks in the base station apparatus related to the application of scrambling sequences will be described with reference to FIG. 13. Note that the function blocks of FIG. 13 primarily relate to the baseband processing section shown in FIG. 11. Also, the functional block diagram of FIG. 13 is simplified to explain the present invention, but is assumed to have configurations which a baseband processing section should normally have.

The base station apparatus 20 has, on the transmitting side, a measurement RE determining section 401, a higher control information generating section 402, a downlink transmission data generating section 403, a downlink control information generating section 404, a reference signal generating section 405, a downlink transmission data coding/modulation section 406, a downlink control information coding/modulation section 407, and a sequence control section 411. Also, the base station apparatus 20 has a downlink channel multiplexing section 408, an IFFT section 409, and a CP adding section 410.

The measurement RE determining section 401 determines the resources (SMRs), to which desired signal measurement CSI-RSs to serve as reference signals for measurement of desired signals (conventional CSI-RSs) are allocated, and the resources (IMRs), to which interference estimation reference signals to serve as reference signals for measurement of interference are allocated. Also, the measurement RE determining section 401 determines the combination of the resources (measurement REs) to allocate the reference signals for desired signal measurement to, and the resources (measurement REs) for interference signal estimation.

For example, as shown in FIG. 4B, the measurement RE determining section 401 sets the resources (IMR #1 and IMR #2), where the interference estimation reference signals to be transmitted from a plurality of transmission points are allocated, in the same positions. Also, the resources (SMRs) where the desired signal measurement CSI-RSs transmitted from each transmission point are allocated, are set not to overlap between the transmission points.

When information regarding the allocation of the interference estimation reference signals and desired signal measurement CSI-RSs (CSI-RS pattern information) is signaled semi-statically to the user terminal, the information is sent to the higher control information generating section 402 for higher layer signaling (for example, RRC signaling). Also, when this information related to allocation is signaled dynamically to the user terminal, the information is sent to the downlink control information generating section 404 to be included in downlink control information. Also, this information related to allocation is sent to the reference signal generating section 405 to generate CSI-RSs and also sent to the downlink transmission data generation section 403 to make downlink transmission data zero-power (muting).

The higher control information generating section 402 generates higher control information to be transmitted by higher layer signaling (for example, RRC signaling), and outputs the generated higher control information to the downlink transmission data coding/modulation section 406. For example, the higher control information generating section 402 generates higher control information (information related to CSI-RS transmission parameters) including the information output from the measurement RE determining section 401. Also, the higher control information generating section 402 generates higher control information including information related to the scrambling sequences to be applied to the interference estimation reference signals determined in sequence control section 411. In this case, it is possible to generate bit information to correspond to the scrambling sequences to apply, with reference to the table shown in FIG. 8 above.

The downlink transmission data generating section 403 generates downlink transmission data, and outputs this downlink transmission data to the downlink transmission data coding/modulation section 406. The downlink transmission data generation section 403 arranges zero-power CSI-RSs (or mutes) in accordance with the allocation information output from the measurement RE determining section 401.

The downlink control information generating section 404 generates downlink control information (in any DCI format), and outputs that downlink control information to the downlink control information coding/modulation section 407. The downlink transmission data coding/modulation section 406 performs channel coding and data modulation of the downlink transmission data and the higher control information, and outputs the results to the downlink channel multiplexing section 408. The downlink control information coding/modulation section 407 performs channel coding and data modulation of the downlink control information, and outputs the result to the downlink channel multiplexing section 408.

The sequence control section 411 controls the scrambling sequences to apply to the interference estimation reference signals, and outputs the result to the reference signal generating section 405. When at least the measurement RE determining section 401 allocates the interference estimation reference signals and the interference estimation reference signals transmitted from another transmission point or a plurality of other transmission points to the same resources, the sequence control section 411 controls the scrambling sequences such that varying scrambling sequences are applied between a plurality of transmission points or transmission point groups where the interference estimation reference signals are allocated to the same resources. Also, the sequence control section 411 is able to determine the types of the scrambling sequences based on base station apparatus-specific information (for example, cell IDs or virtual cell IDs), as described earlier. Besides, the sequence control section 411 is able to determine the scrambling sequences based on the allocation pattern of the desired signal measurement CSI-RSs. Also, the sequence control section 411 outputs information related to the determined scrambling sequence to the reference signal generating section 405. Also, when the determined scrambling sequences (or combinations of base sequences and scrambling sequences) are reported to the user terminal, information related to the determined scrambling sequences (or combinations of base sequences and scrambling sequences) is output to the higher control information generating section 402.

The reference signal generating section 405 generates desired signal measurement CSI-RSs and interference estimation reference signals in accordance with the allocation information determined by the measurement RE determining section 401, and outputs these CSI-RSs to the downlink channel multiplexing section 408. Also, the reference signal generating section 405 multiplies the generated interference estimation reference signals by scrambling sequences, based on the types of scrambling sequences output from the sequence control section 411. The reference signal generating section 405 multiplies, for example, a sequence of conventional CSI-RSs by scrambling sequences controlled by the sequence control section 411, so that varying scrambling sequences are applied between a plurality of transmission points or transmission point groups where the interference estimation reference signals are allocated to the same resources.

The downlink channel multiplexing section 408 combines the downlink control information, CSI-RSs, higher control information and downlink transmission data, and generates a transmission signal. The downlink channel multiplexing section 408 outputs the generated transmission signal to the IFFT section 409. The IFFT section 409 applies an inverse fast Fourier transform to the transmission signal and converts the transmission signal from a frequency domain signal to a time domain signal. The transmission signal after the IFFT is output to the CP adding section 410. The CP adding section 410 adds a CP (Cyclic Prefix) to the transmission signal after the IFFT, and outputs the transmission signal, to which the CP has been added, to the amplifying section 202 shown in FIG. 11.

Figure 14:
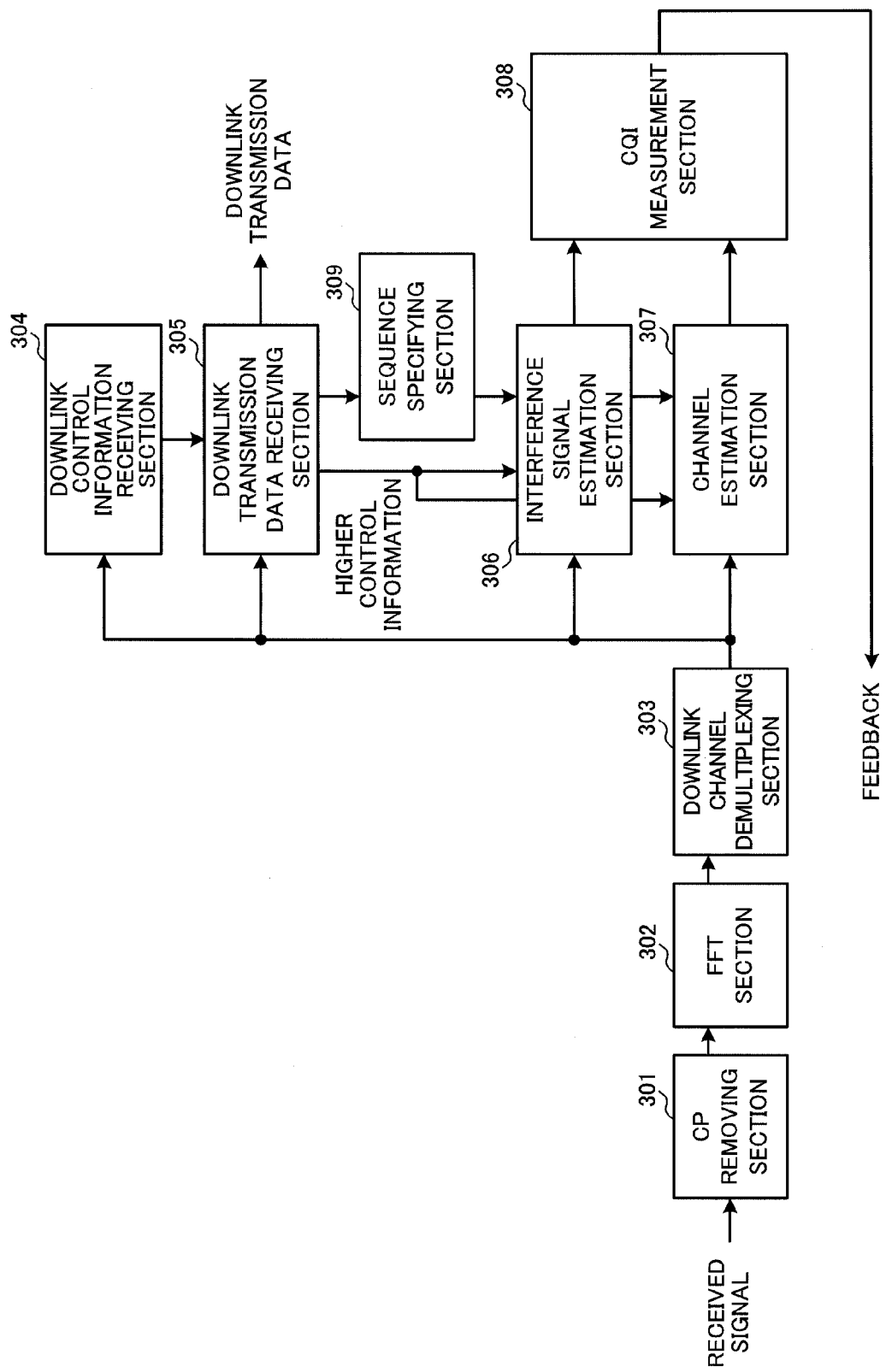
FIG. 14 is a functional block diagram of a user terminal.

Next, the function blocks of a user terminal according to the present embodiment will be described with reference to FIG. 14. Note that the function blocks of FIG. 14 primarily relate to the baseband processing section 104 shown in FIG. 12. Also, the function blocks shown in FIG. 12 are simplified to explain the present invention, and are assumed to have configurations which a baseband processing section should normally have.

The user terminal 10 has, on the receiving side, a CP removing section 301, an FFT section 302, a downlink channel demultiplexing section 303, a downlink control information receiving section 304, a downlink transmission data receiving section 305, an interference signal estimation section 306, a channel estimation section 307, a CQI measurement section 308, and a sequence specifying section 309.

Figure 12:
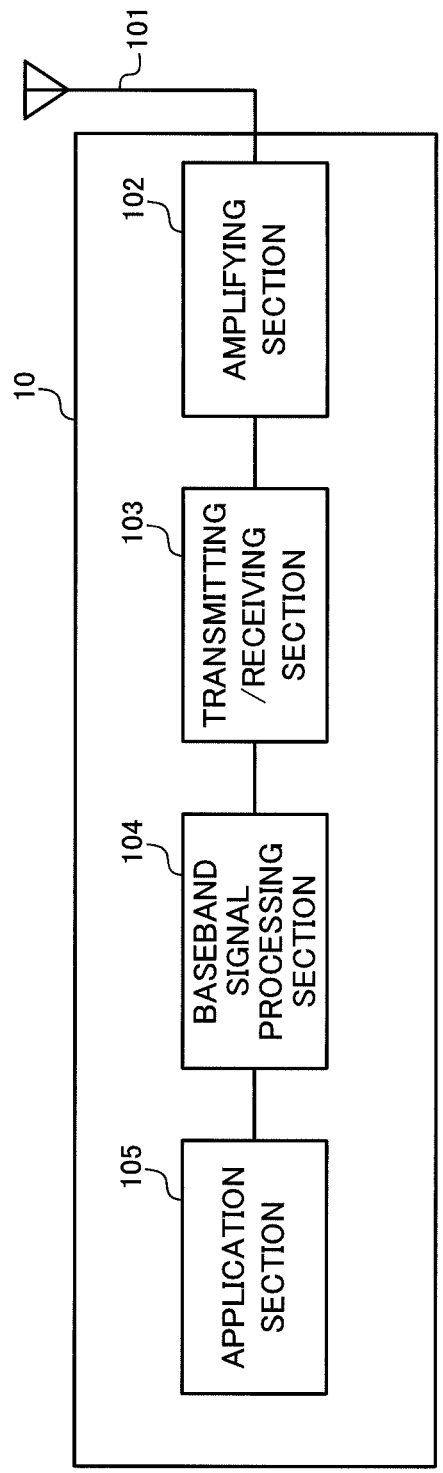
FIG. 12 is a diagram to explain an overall configuration of a user terminal.

A transmission signal that is transmitted from the base station apparatus 20 is received in the transmitting/receiving antenna 101 shown in FIG. 12, and output to the CP removing section 301. The CP removing section 301 removes the CP from the received signal, and outputs the result to the FFT section 302. The FFT section 302 performs a fast Fourier transform (FFT) of the signal, from which the CP has been removed, and converts the time domain signal into a frequency domain signal. The FFT section 302 outputs the signal converted into a frequency domain signal to the downlink channel demultiplexing section 303.

The downlink channel demultiplexing section 303 separates the downlink channel signal into downlink control information, downlink transmission data, and CSI-RSs. The downlink channel demultiplexing section 303 outputs the downlink control information to the downlink control information receiving section 304, outputs the downlink transmission data and the higher control information to the downlink transmission data receiving section 305, outputs the interference estimation reference signals to the interference signal estimation section 306, and outputs the desired signal measurement CSI-RSs to the channel estimation section 307.

The downlink control information receiving section 304 demodulates the downlink control information, and outputs the demodulated downlink control information to the downlink transmission data receiving section 305. The downlink transmission data receiving section 305 demodulates the downlink transmission data using the demodulated downlink control information. At this time, the downlink transmission data receiving section 305 specifies the desired signal measurement REs (SMRs) and interference measurement REs (IMRs) based on resource information included in the higher control information. The downlink transmission data receiving section 305 demodulates the user data by excluding the desired signal measurement REs and interference measurement REs. Also, the downlink transmission data receiving section 305 outputs the higher control information included in the downlink transmission data to the sequence specifying section 309, the interference signal estimation section 306, and the channel estimation section 307.

The sequence specifying section 309 specifies the scrambling sequences applied to the interference estimation reference signals in the base station apparatus. As described above, when scrambling sequences are associated with cell IDs and CSI-RS pattern positions, the sequence specifying section 309 is able to determine the scrambling sequences based on these pieces of information. Also, when information about scrambling sequences (or combinations of base sequences and scrambling sequences) is defined by bit information, it is possible to specify the scrambling sequences with reference to the table shown in FIG. 8 above.

The interference signal estimation section 306 estimates interference signals by means of the interference measurement REs, based on information such as the scrambling sequences (or combinations of base sequences and scrambling sequences) specified in the sequence specifying section 309, transmission parameters included in the higher control information (or downlink control information) and so on. The interference signal estimation section 306 is able to estimate interference signals and average measurement results of all resource blocks. The averaged interference signal estimation result is reported to the CQI measurement section 308.

The channel estimation section 307 specifies the desired signal measurement REs (CSI-RS resources) based on information such as transmission parameters included in the higher control information (or downlink control information), and estimates desired signals with the desired signal measurement REs. Note that, as shown earlier with reference to FIG. 9B, the channel estimation section 307 is also capable of performing channel estimation using the interference measurement REs (IMRs), in addition to the desired signal measurement REs (SMRs).

The channel estimation section 307 reports the channel estimation values to the CQI measurement section 308. The CQI measurement section 308 calculates the channel state (CQI) based on the interference estimation result reported from the interference signal estimation section 306, the channel estimation result reported from the channel estimation section 307, and the feedback mode. Note that, for the feedback mode, any of wideband CQI, subband CQI, best-M average may be set. The CQI calculated in the CQI measurement section 308 is reported to the base station apparatus 20 as feedback information.

The present invention is by no means limited to the above embodiment and can be implemented in various modifications. For example, without departing from the scope of the present invention, it is possible to adequately change the positions to set CSI-RSs, the positions to set muting (zero power), the number of processing sections, the order of steps, the number of CSI-RSs, the count of muting, and the number of transmission points in the above description, and still carry out the present invention. Also, although a case has been described above where a plurality of transmission points are a plurality of base station apparatuses, a transmission point may be an antenna as well. Besides, the present invention can be implemented with various changes, without departing from the scope of the present invention.

The disclosure of Japanese Patent Application No. 2012-108743, filed on May 10, 2012, including the specification, drawings and abstract, is incorporated herein by reference in its entirety.

The invention claimed is:

1. A radio communication system comprising a plurality of base station apparatuses that transmit desired signal measurement reference signals for measuring a channel state, and interference estimation reference signals, and a user terminal that connects with the plurality of base station apparatuses via radio links, wherein:

each base station apparatus comprises:
  a determining section configured to determine resources where the desired signal measurement reference signals and the interference estimation reference signals are allocated; and a reference signal generating section configured to apply scrambling sequences and generate the interference estimation reference signals; and wherein, when at least the determining section allocates the interference estimation reference signals and interference estimation reference signals transmitted from another transmission point or from a plurality of other transmission points to the same resources, the reference signal generating section controls the scrambling sequence so that varying scrambling sequences are applied between a plurality of transmission points or transmission point groups where the interference estimation reference signals are allocated to the same resources, and wherein the determining section determines the resources such that the interference estimation reference signals are randomly arranged in a downlink data channel region.

2. The radio communication system according to claim 1, wherein the reference signal generating section multiplies a base sequence by scrambling sequences and generates the interference estimation reference signals.

3. The radio communication system according to claim 2, wherein the reference signal generating section uses one of an orthogonal sequence and a non-orthogonal sequence as the base sequence.

4. The radio communication system according to claim 1, wherein the reference signal generating section generates the interference estimation reference signals using scrambling sequences that vary in a time domain or a frequency domain.

5. The radio communication system according to claim 1, wherein the reference signal generating section generates the interference estimation reference signals using a scrambling sequence of a sequence length stretching over a plurality of resource blocks.

6. The radio communication system according to claim 1, wherein the reference signal generating section generates the interference estimation reference signals using a scrambling sequence of a sequence length confined within one resource block.

7. The radio communication system according to claim 1, wherein the determining section determines the resources for the interference estimation reference signals to belong to a multiplexing pattern of the desired signal measurement reference signals or part of the multiplexing pattern.

8. The radio communication system according to claim 1, wherein each base station apparatus reports information about scrambling sequences or information about combinations of base sequences and scrambling sequences, to the user terminal.

9. The radio communication system according to claim 8, wherein each base station apparatus reports the information about scrambling sequences or the information about combinations of base sequences and scrambling sequences to the user terminal through one of higher layer signaling and a broadcast signal.

10. The radio communication system according to claim 1, wherein, when the interference estimation reference signals are transmitted, each base station apparatus reports transmission parameters, including sequence information for specifying the interference estimation reference signals, to the user terminal through higher layer signaling.

11. The radio communication system according to claim 1, wherein, when scrambling sequences, or combinations of base sequences and scrambling sequences, are associated with information that is specific to each transmission point, the reference signal generating section controls the scrambling sequences to apply depending on the transmission point-specific information.

12. The radio communication system according to claim 11, wherein, as the transmission point-specific information, cell IDs or virtual cell IDs of the transmission points are defined in association with the scrambling sequences or the combinations of base sequences and scrambling sequences.

13. The radio communication system according to claim 11, wherein the reference signal generating section defines the scrambling sequences or the combinations of base sequences and scrambling sequences in association with multiplexing patterns of the desired signal measurement reference signals.

14. The radio communication system according to claim 11, wherein the reference signal generating section defines the scrambling sequences, or the combinations of base sequences and scrambling sequences, in association with user terminal IDs.

15. The radio communication system according to claim 1, wherein the base station apparatus further comprises a transmitting section configured to signal, to the user terminal, information about two-resource element sets where the interference estimation reference signals are randomly arranged, and the determining section determines the resources such that in each of the sets, the interference estimation reference signals are made orthogonal to the interference estimation reference signals transmitted from the other transmission point or from the plurality of other transmission points.

16. The radio communication system according to claim 15, wherein the transmitting section signals position information of the interference estimation reference signals in each of the sets to the user terminal.

17. A base station apparatus that transmits desired signal measurement reference signals for measuring a channel state, and interference estimation reference signals, to a user terminal, the base station apparatus comprising:

a determining section configured to determine resources where the desired signal measurement reference signals and the interference estimation reference signals are allocated; and a reference signal generating section configured to apply scrambling sequences and generate the interference estimation reference signals, wherein, when at least the determining section allocates the interference estimation reference signals and interference estimation reference signals transmitted from another transmission point or from a plurality of other transmission points to the same resources, the reference signal generating section controls the scrambling sequence so that varying scrambling sequences are applied between a plurality of transmission points or transmission point groups where the interference estimation reference signals are allocated to the same resources, and wherein the determining section determines the resources such that the interference estimation reference signals are randomly arranged in a downlink data channel region.

18. A user terminal comprising:

a receiving section configured to receive desired signal measurement reference signals for measuring a channel state, and interference estimation reference signals to which varying scrambling sequences are applied between a plurality of transmission points or transmission point groups;

a sequence specifying section configured to specify the scrambling sequences applied to the interference estimation reference signals transmitted from each transmission point;

an estimation section configured to carry out channel estimation and interference signal estimation based on the desired signal measurement reference signals and/or the interference estimation reference signals; and a measurement section configured to measure the channel state using estimation results in the estimation section, wherein resources where the desired signal measurement reference signals and the interference estimation reference signals are allocated are determined such that the interference estimation reference signals are randomly arranged in a downlink data channel region.

19. A radio communication method for a plurality of base station apparatuses that transmit desired signal measurement reference signals for measuring a channel state, and interference estimation reference signals, and a user terminal that connects with the plurality of base station apparatuses via radio links, the radio communication method comprising the steps of:

at each base station apparatus:

determining resources where the desired signal measurement reference signals and the interference estimation reference signals are allocated; and applying scrambling sequences and generating the interference estimation reference signals, wherein, when at least the interference estimation reference signals and interference estimation reference signals transmitted from another transmission point or from a plurality of other transmission points are allocated to the same resources, the scrambling sequence are controlled so that varying scrambling sequences are applied between a plurality of transmission points or transmission point groups where the interference estimation reference signals are allocated to the same resources, and wherein in the determining step, the resources are determined such that the interference estimation reference signals are randomly arranged in a downlink data channel region.

* * * * *